United States Patent
Anderson et al.

(10) Patent No.: US 9,500,285 B2
(45) Date of Patent: *Nov. 22, 2016

(54) HIGH PRESSURE BALL VALVE AND PACKING

(71) Applicant: Mogas Industries, Inc., Houston, TX (US)

(72) Inventors: Alfred Lewis Anderson, Houston, TX (US); M. Robert Junier, Houston, TX (US)

(73) Assignee: Mogas Industries, Inc., Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 15/012,670

(22) Filed: Feb. 1, 2016

(65) Prior Publication Data

US 2016/0146355 A1 May 26, 2016

Related U.S. Application Data

(63) Continuation-in-part of application No. 13/790,433, filed on Mar. 8, 2013, now Pat. No. 9,249,889.

(60) Provisional application No. 61/608,726, filed on Mar. 9, 2012.

(51) Int. Cl.
*F16K 5/06* (2006.01)
*F16K 5/18* (2006.01)
*F16K 5/20* (2006.01)

(52) U.S. Cl.
CPC .............. *F16K 5/0663* (2013.01); *F16K 5/06* (2013.01); *F16K 5/0642* (2013.01); *F16K 5/0689* (2013.01); *F16K 5/0694* (2013.01); *F16K 5/188* (2013.01); *F16K 5/20* (2013.01); *F16K 5/205* (2013.01)

(58) Field of Classification Search
CPC .......... F16K 5/20; F16K 5/205; F16K 5/0689; F16K 5/0694; F16K 5/188; F16K 5/0663; F16K 5/0642; F16K 5/06
USPC .............. 251/172, 175, 192, 315.01–315.16, 251/314–317
See application file for complete search history.

(56) References Cited

U.S. PATENT DOCUMENTS

| | | |
|---|---|---|
| 2,320,329 A | 5/1943 | Frank |
| 3,053,689 A | 7/1962 | Ross et al. |
| 3,313,633 A | 4/1967 | Nicholas |
| 3,380,706 A | 4/1968 | Scaramucci |
| 3,455,534 A | 7/1969 | Scaramucci |
| 3,497,178 A | 2/1970 | Priese |

(Continued)

FOREIGN PATENT DOCUMENTS

| | | |
|---|---|---|
| CA | 2297018 | 4/2004 |
| CN | 2911358 Y | 6/2007 |

OTHER PUBLICATIONS

Declaration of Alfred Lewis Anderson, dated Jul. 17, 2015, U.S. Appl. No. 13/790,433, filed Mar. 8, 2013.

*Primary Examiner* — John Bastianelli
(74) *Attorney, Agent, or Firm* — Daniel N. Lundeen; Lundeen & Lundeen PLLC

(57) ABSTRACT

A ball valve for ultra-high pressure wherein the inner annular surface(s) of the valve seat(s) has an sealing face in sealing engagement with the flow control element, support surfaces adjacent the sealing face in contact with the flow control element, and vent grooves between adjacent support surfaces and the sealing face. A method to utilize the ball valve involves rotating the control element and maintaining a pressure of 275.8 MPa (40,000 psi) or more for at least 1 hour without leaking before opening or after closing the valve.

20 Claims, 12 Drawing Sheets

(56) References Cited

U.S. PATENT DOCUMENTS

| | | | |
|---|---|---|---|
| 3,598,363 | A | 8/1971 | Shaw |
| 4,044,175 | A | 8/1977 | Coxon et al. |
| 4,206,904 | A | 6/1980 | Dante |
| 4,218,042 | A | 8/1980 | Eckel |
| 4,602,762 | A | 7/1986 | Koch et al. |
| 5,127,628 | A | 7/1992 | Kemp |
| 5,562,116 | A | 10/1996 | Henwood |
| 6,004,372 | A | 12/1999 | Quets |
| 6,095,493 | A | 8/2000 | Velan |
| 6,240,946 | B1 | 6/2001 | Beasley |
| 6,648,207 | B2 | 11/2003 | Buchanan |
| 7,093,819 | B1 | 8/2006 | Hall et al. |
| 7,249,751 | B2 | 7/2007 | Hall et al. |
| 7,455,372 | B2 | 11/2008 | Wang et al. |
| 7,458,358 | B2 | 12/2008 | Lineton et al. |
| 7,635,113 | B2 | 12/2009 | Bearer et al. |
| 2002/0008223 | A1 | 1/2002 | Guerra |

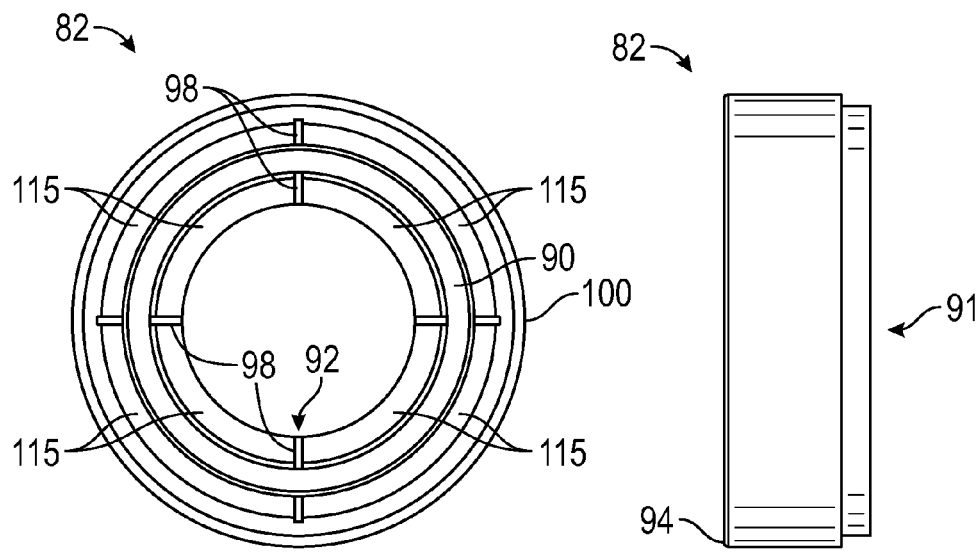
FIG. 5  FIG. 6
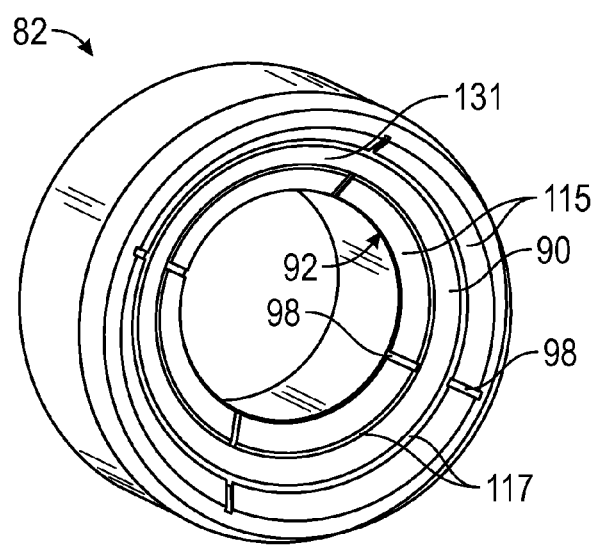
FIG. 7

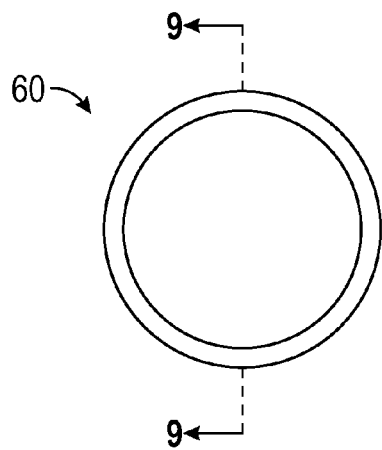 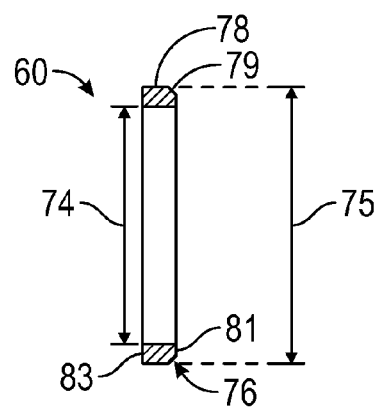
FIG. 8  FIG. 9
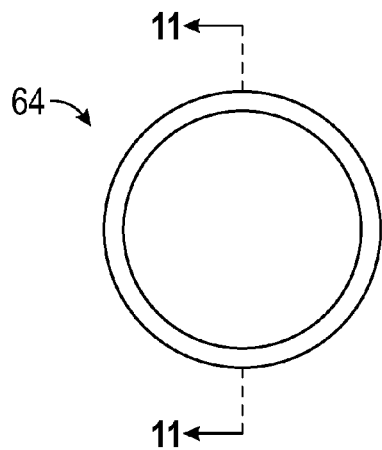 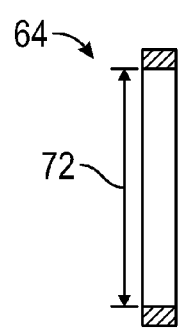
FIG. 10  FIG. 11
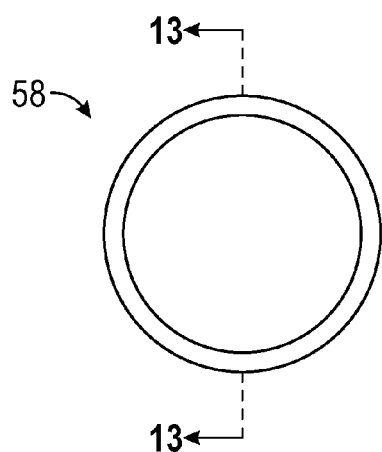 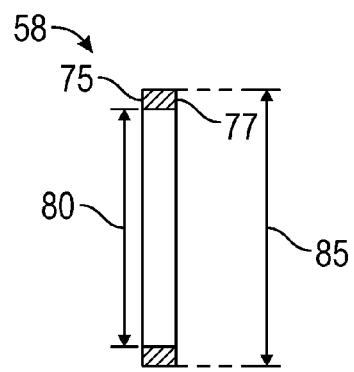
FIG. 12  FIG. 13

HIGH PRESSURE BALL VALVE AND PACKING

RELATED APPLICATIONS

This application is a continuation-in-part of U.S. application Ser. No. 13/790,433, filed Mar. 8, 2013, now U.S. Pat. No. 9,249,889, which claims priority to U.S. Provisional Application Ser. No. 61/608,726 filed Mar. 9, 2012, the disclosures of which are fully incorporated herein by reference.

BACKGROUND

Ball valves are often subjected to extremely high pressures and temperatures in the various processes where they are used. Leaking past seals associated with the rotatable closure members present operational issues. The tendency for valves to leak increases under conditions of high pressure and high temperature, which is known to occur in service valves which operate through a wide range of temperatures. Further, such valves may rely on a high pressure differential to effect a tight seal in the reverse direction, i.e., when a higher pressure is applied to the normally low pressure or outlet side of the valve, and may have a tendency to leak excessively at lower pressures insufficient to fully engage the high pressure seal.

SUMMARY

The instant disclosure is directed to a two-way or bidirectional high pressure ball valve and a method using the bidirectional ball valve.

In one embodiment, a bidirectional valve comprises:
a valve body comprising an axial fluid flow bore disposed therethrough having an inlet end located opposite an outlet end and a flow control assembly located within a portion of the fluid flow bore,
the flow control assembly comprising a flow control element disposed between, and having an outer surface in sealing contact with an inner annular surface of an inlet valve seat and an inner annular surface of an outlet valve seat, wherein the flow control element is rotatable between an open and a closed position;
a valve stem extending from an outer end through a packing bore disposed radially around the valve stem in the valve body to an inner end of the valve stem, wherein the inner end of the valve stem comprises a plurality of sides dimensioned and arranged to rotationally engage a corresponding recess having a corresponding number of sides disposed into the flow control element, wherein a distance between the sides of the recess are dimensioned relative to a distance between the plurality of sides of the first end of the valve stem to allow for an amount of lateral movement of the flow control element laterally between the fluid flow bore inlet end and the fluid flow bore outlet end such that a pressure applied to the inlet end of the fluid flow bore results in lateral movement of the flow control assembly towards the outlet end of the fluid flow bore in an amount sufficient to produce sealing contact between an outer annular surface of the outlet valve seat with a portion of the valve body, such that a pressure applied to the outlet end of the fluid flow bore results in lateral movement of the flow control assembly towards the inlet end of the fluid flow bore in an amount sufficient to produce sealing contact between an outer annular surface of the inlet valve seat and a portion of the valve body, or a combination thereof,
wherein at least a portion of the inner annular surface of the inlet valve seat, the inner annular surface of the outlet valve seat, or a combination thereof, comprise a sealing face dimensioned and arranged to sealingly engage a portion of the outer surface of the fluid control element, and wherein at least a portion of the inner annular surface of the inlet valve seat, the inner annular surface of the outlet valve seat, or a combination thereof, comprise a plurality of support surfaces dimensioned and arranged in physical contact with the outer surface of the fluid control element adjacent the sealing face.

In an embodiment, a method comprises:
providing a bidirectional valve comprising a valve body comprising an axial fluid flow bore disposed therethrough having an inlet end located opposite an outlet end and a flow control assembly located within a portion of the fluid flow bore,
the flow control assembly comprising a flow control element disposed between, and having an outer surface in sealing contact with an inner annular surface of an inlet valve seat and an inner annular surface of an outlet valve seat, wherein the flow control element is rotatable between an open and a closed position;
a valve stem extending from an outer end through a packing bore disposed radially around the valve stem in the valve body to an inner end of the valve stem, wherein the inner end of the valve stem comprises a plurality of sides dimensioned and arranged to frictionally engage a corresponding recess having a corresponding number of sides disposed into the flow control element, wherein a distance between the sides of the recess are dimensioned relative to a distance between the plurality of sides of the first end of the valve stem to allow for an amount of lateral movement of the flow control element laterally between the fluid flow bore inlet end and the fluid flow bore outlet end such that a pressure applied to the inlet end of the fluid flow bore results in lateral movement of the flow control assembly towards the outlet end of the fluid flow bore in an amount sufficient to produce sealing contact between an outer annular surface of the outlet valve seat with a portion of the valve body, such that a pressure applied to the outlet end of the fluid flow bore results in lateral movement of the flow control assembly towards the inlet end of the fluid flow bore in an amount sufficient to produce sealing contact between an outer annular surface of the inlet valve seat and a portion of the valve body, or a combination thereof,
wherein at least a portion of the inner annular surface of the inlet valve seat, the inner annular surface of the outlet valve seat, or a combination thereof, comprise a sealing face dimensioned and arranged to sealingly engage a portion of the outer surface of the fluid control element, and wherein at least a portion of the inner annular surface of the inlet valve seat, the inner annular surface of the outlet valve seat, or a combination thereof, comprise a plurality of support surfaces dimensioned and arranged in physical contact with the outer surface of the fluid control element adjacent the sealing face; and
rotating the valve stem such that the control element is in the closed position prior to or after applying a pressurized fluid having a pressure of greater than 275.8 MPa (40,000 psi) and a temperature of greater than or equal to about 200° C. to the inlet end of the fluid flow bore or to the outlet end of the fluid flow bore and maintaining the pressure and temperature for at least 1 hour, wherein the fluid is maintained by the valve without leaking.

BRIEF DESCRIPTION OF THE DRAWINGS

FIG. 5 is a frontal view an embodiment of a valve seat according to the instant disclosure;

FIG. 6 is a side view of the valve seat shown in FIG. 5;

FIG. 7 is an isometric view of the valve seat shown in FIG. 5;

FIG. 8 is a frontal view of an embodiment of an upper or lower anti-extrusion ring according to the instant disclosure;

FIG. 9 is a side view of the upper or lower anti-extrusion ring along line 9-9 shown in FIG. 8;

FIG. 10 is a frontal view of an embodiment of a top anti-extrusion ring according to the instant disclosure;

FIG. 11 is a side view of the top anti-extrusion ring along line 11-11 shown in FIG. 10;

FIG. 12 is a frontal view of an embodiment of a sealing ring according to the instant disclosure;

FIG. 13 is a side view of sealing ring along line 13-13 shown in FIG. 12;

DETAILED DESCRIPTION

Detailed embodiments are disclosed herein. However, it is understood that the disclosed embodiments are merely exemplary of the disclosure, which may be embodied in various forms. Specific structural and functional details disclosed herein are not intended to be limiting, but merely illustrations that can be modified within the scope of the attached claims.

The instant disclosure is directed to a bidirectional ball valve suitable for the passage of fluid under high pressure, and a method of using the valve in a high pressure environment.

Figure 1:
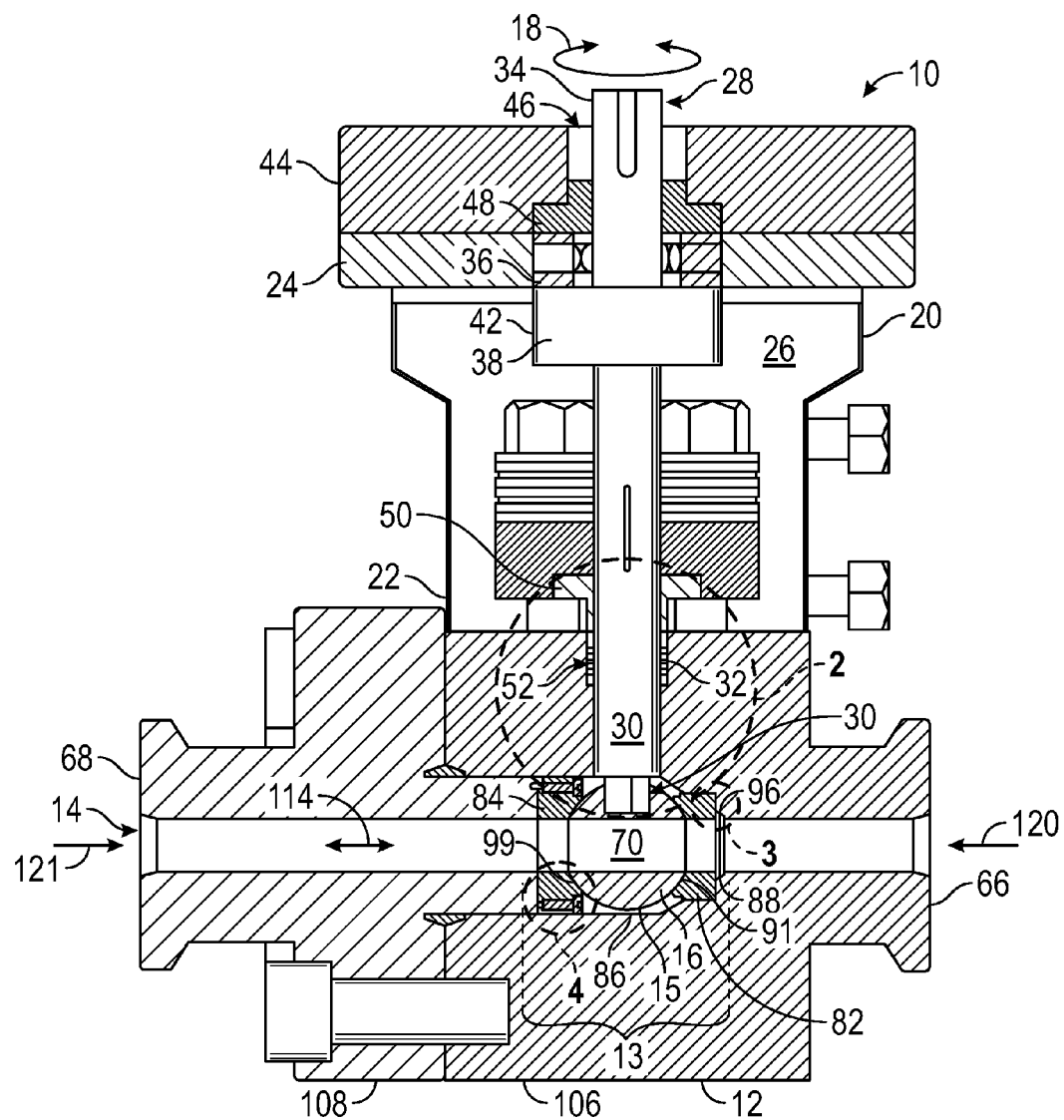
FIG. 1 is a schematic cross sectional drawing of one embodiment of a ball valve according to the instant disclosure.
Figure 2:
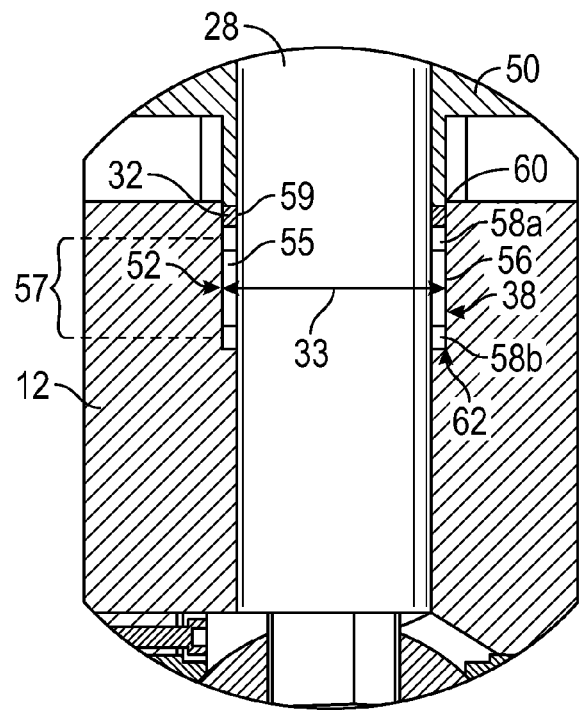
FIG. 2 is an exploded view of Section 2 shown in FIG. 1.

Referring to the FIG. 1, in an embodiment bidirectional ball valve 10 includes a valve body 12 comprising an axial fluid flow bore 14 disposed there through having an inlet end 66 located opposite an outlet end 68 and a flow control assembly 13 located within a portion of fluid flow bore 14. In an embodiment, flow control assembly 13 comprises a flow control element 16 disposed between, and having an outer surface 15 in sealing contact with an inner annular surface 91 of an inlet valve seat 82 and an inner annular surface 99 of an outlet valve seat 84 (See FIG. 4), wherein flow control element 16 is rotatable 18 between an open position as shown in FIG. 1, and a closed position (not shown).

As shown in FIG. 1, in an embodiment, fluid flow bore 14, also referred to herein as fluid flow passage 14, extends axially from an inlet end 66 to an outlet end 68 of the fluid flow passage of bidirectional ball valve 10. Fluid flow passage 14 includes a flow control element 16, also referred to herein as ball member 16 and/or ball 16, having an axial fluid flow bore 70 therethrough. In the embodiment shown, valve body 12 comprises a plurality of components which include an upstream or inlet portion 106 sealing engaged with, and connected to a downstream or outlet portion 108.

Flow control element 16 is rotatable between an open and a closed position as indicated by arrow 18 such that passage of fluid is permitted when the fluid flow passage 14 when axial fluid flow bore 70 of flow control element 16 is aligned with fluid flow passage 14, and can prevent the passage of fluid when axial fluid flow bore 70 is not aligned with fluid flow passage 14 (not shown).

As shown in FIG. 1, bidirectional ball valve 10 may further include a bracket 20 having a lower end 22 attached to valve body 12, and an upper end 24 spaced laterally therefrom defining an open access area 26 between upper end 24 and valve body 12. Bidirectional ball valve 10 further includes a valve stem 28 having a first end 30, also referred to herein as an inner end 30 of valve stem 28, engaging flow control element 16 and extending through a packing bore 32 in valve body 12 to a second end 34, also referred to herein as an outer end 34 of valve stem 28, centered in a bore 36 in bracket 20.

As used herein, the determination of inner (also referred to as lower) and outer (also referred to as upper) is merely in relation to the proximity of the surface to inner end 30 of valve stem 28. The inner or lower position being closer in proximity to the inner end 30 of valve stem 28 when assembled in the valve, as compared to the outer or upper counterpart.

As shown in FIG. 1, valve stem 28 may further include a shoulder 38 with an enlarged outer diameter 40 (See FIG. 14A) formed on stem 28 in the open access area 26 adjacent bracket 20. In an embodiment, outside diameter 40 of shoulder 38 is less than an inside diameter of the bracket bore 42 disposed in bracket 20. In an embodiment, the valve stem further comprises a shoulder with an enlarged outer diameter formed on the stem wherein the outside diameter of the shoulder is greater than an inside diameter of a portion of the valve body, a portion of a bracket attached to the valve body, a bushing attached to the valve body, or a combination thereof which is disposed around the valve stem between the second end and the shoulder to prevent the valve stem from being "blown out" when the valve is placed under pressure.

As shown in FIG. 1, bidirectional ball valve 10 may further include a top plate 44 attached to upper end 24 of bracket 20 on the surface located opposite valve body 12. In an embodiment, top plate 44 comprises a bore hole 46 centered about valve stem 28 having an inner diameter which is less than outer diameter 40 of stem shoulder 38. In an embodiment, bidirectional ball valve 10 may further include a contiguous shear bushing 48 disposed between stem shoulder 38 and top plate 44, wherein at least a portion of shear bushing 48 has an outside diameter larger than the inside diameter of top plate bore 46, and an inside diameter less than outer diameter 40 of stem shoulder 38.

Figure 16:
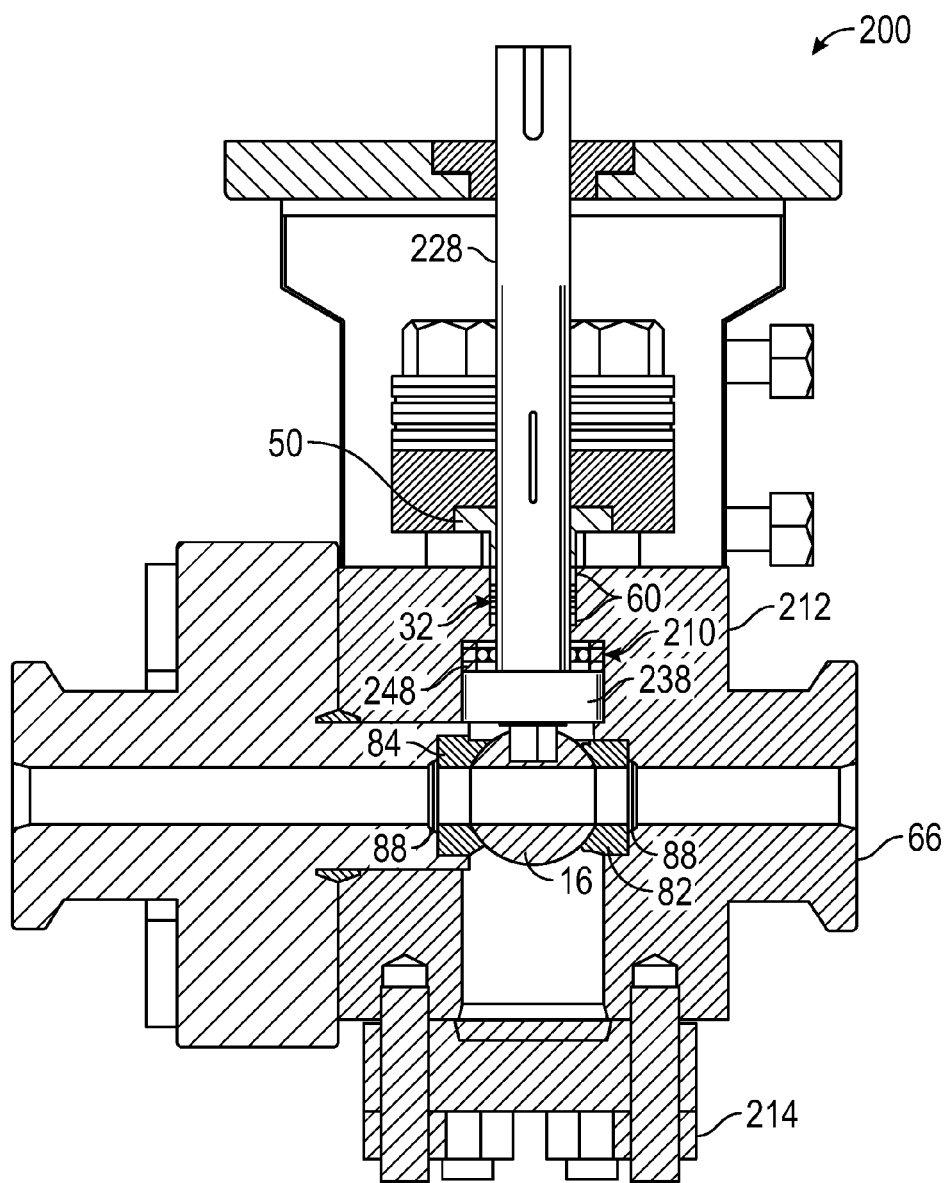
FIG. 16. is a schematic cross sectional drawing of another embodiment of a ball valve according to the instant disclosure.

In an alternative embodiment, as shown in FIG. 16, a ball valve 200 may include a shoulder 238 on a valve stem 228, within a valve body 212. As is shown in FIG. 16, in an embodiment, ball valve 200 may further include a contiguous shear bushing 248 disposed between stem shoulder 238 and valve body 212 located within a bushing well bore 210 within valve body 212. As shown in FIG. 16, ball valve 200 may further include a bottom plate 214 attached to valve body 212 to allow for removal of valve stem 228.

In an embodiment, bidirectional ball valve 10 may further include a packing gland 50 continuously secured around valve stem 28 in open access area 26 for securing valve stem packing assembly 52 around valve stem 28 in packing bore 32.

Figure 19:
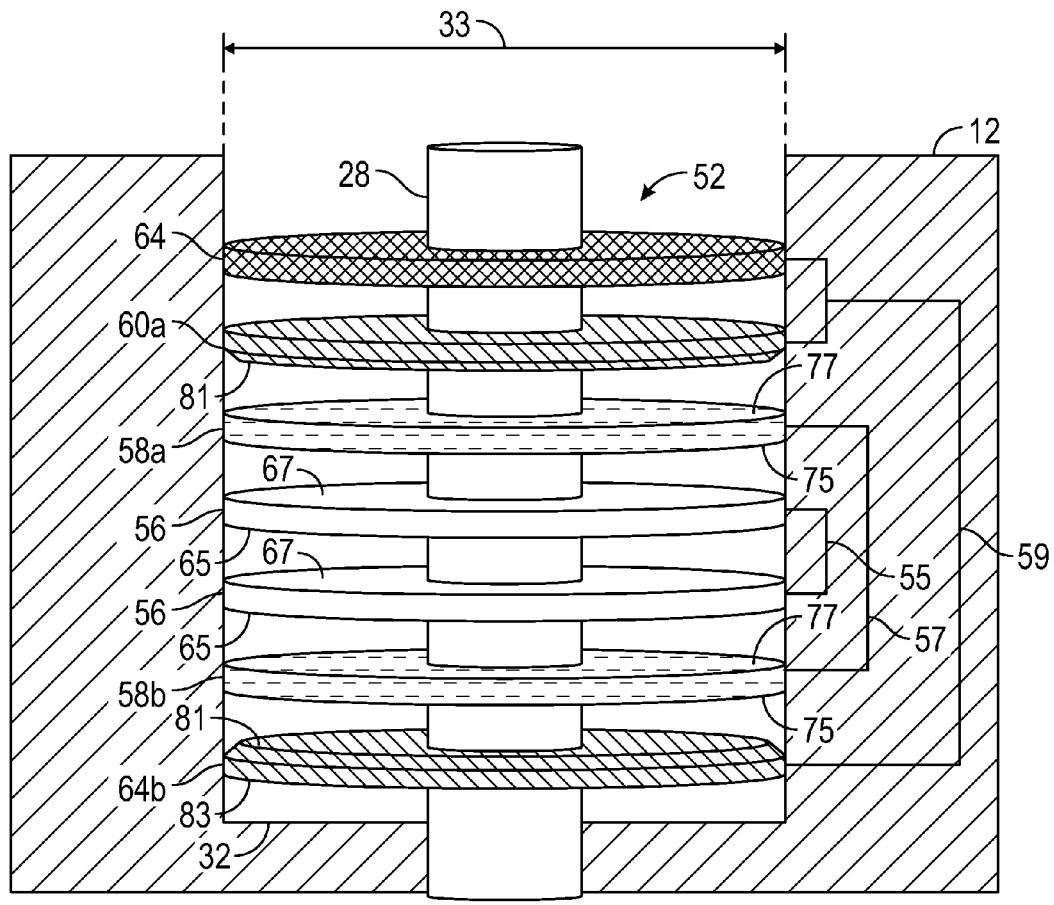
FIG. 19 is an expanded view of a valve stem packing assembly according to an embodiment of the present disclosure.
Figure 20:
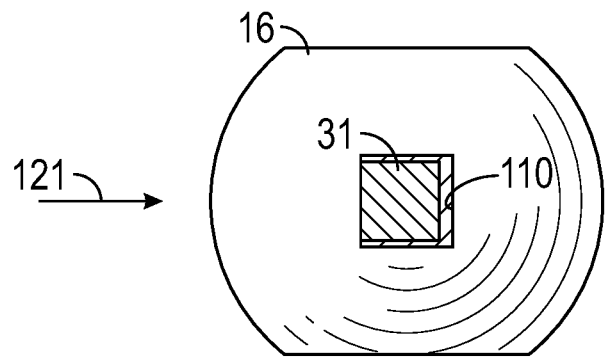
FIG. 20 is a top, cross-sectional view of the assembly of the stem (FIGS. 14A, 14B) and ball (FIG. 15), showing application of fluid pressure from direction 121.
Figure 21:
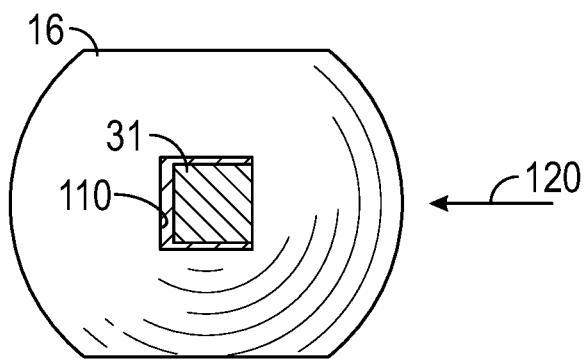
FIG. 21 is a top, cross-sectional view of the stem-ball assembly of FIG. 20, showing application of fluid pressure from direction 120.
Figure 22:
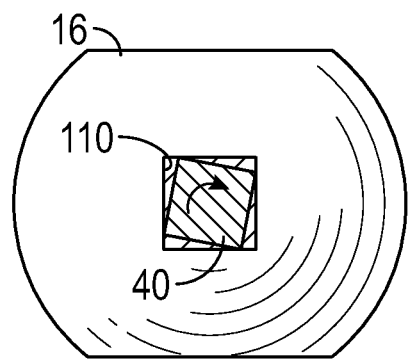
FIG. 22 is a top, cross-sectional view of the stem-ball assembly of FIGS. 20, 21, showing rotational engagement of the ball by the stem.
Figure 23:
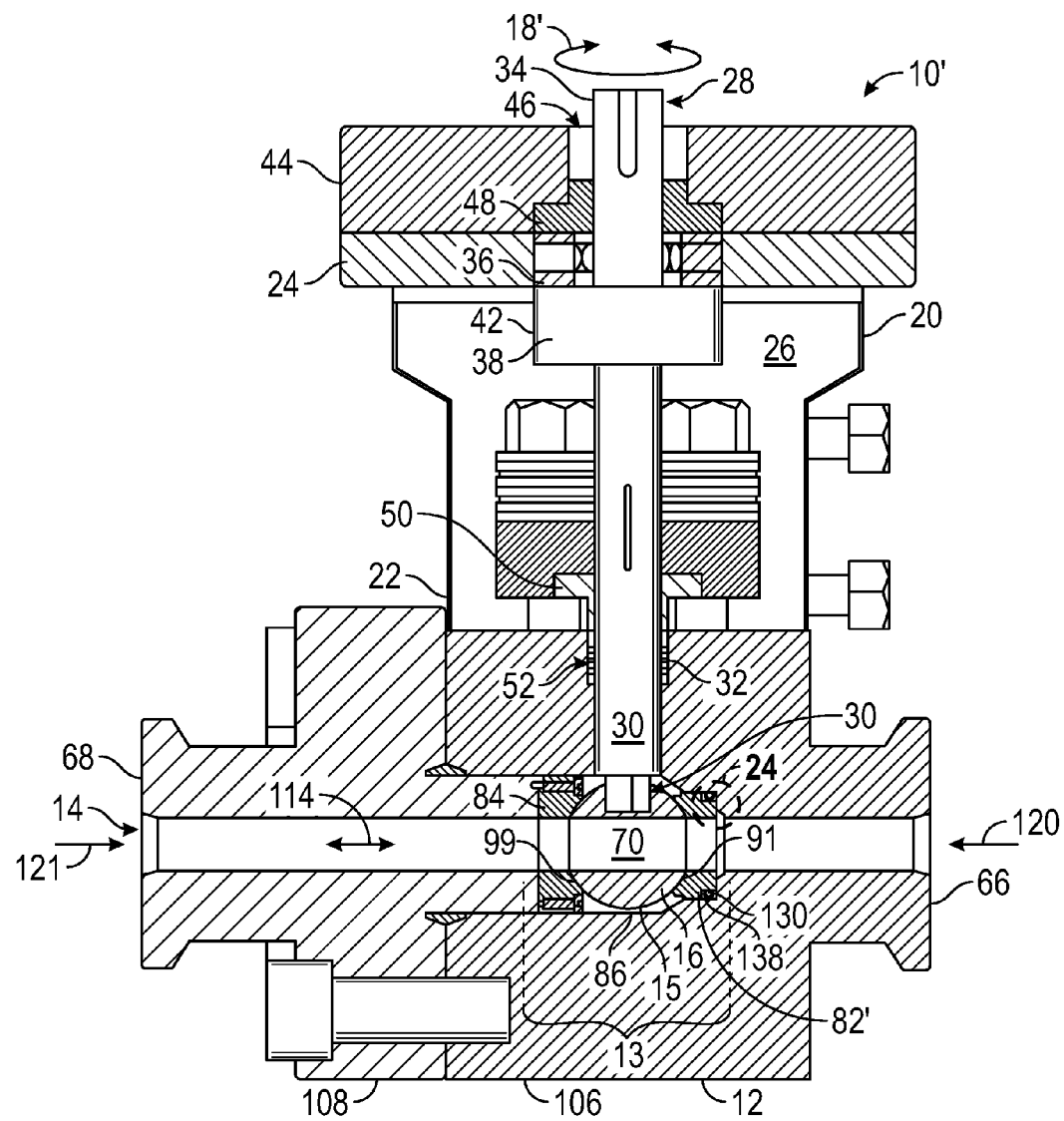
FIG. 23 is a schematic cross sectional drawing of a further embodiment of a ball valve according to the present invention with a secondary seal.

As shown in FIG. 1, and in the exploded view of FIG. 19, in an embodiment, valve stem packing assembly 52 comprises a plurality of packing rings having an inner diameter (e.g., see FIG. 9, inner diameter 74), dimensioned to be disposable around valve stem 28, and an outer diameter (e.g., see FIG. 9, outer diameter 75) dimensioned to be locatable within an inner diameter 33 of the packing bore 32 disposed radially around valve stem 28 in valve body 12.

In an embodiment, the valve stem packing assembly 52 comprises a thermoplastic ring assembly 55 sandwiched between, and in physical contact with a sealing ring assembly 57 sandwiched between, and in physical contact with an anti-extrusion ring assembly 59 and valve body 12.

Figure 17:
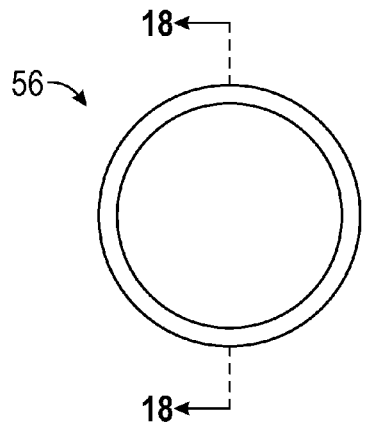
FIG. 17 is a frontal view of an embodiment of a thermoplastic ring according to the instant disclosure.
Figure 18:
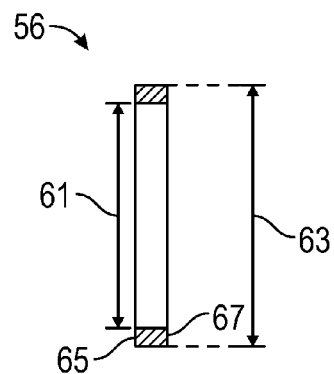
FIG. 18 is a side view of the thermoplastic ring along line 18-18 shown in FIG. 17.

In an embodiment, as shown in FIG. 19, thermoplastic ring assembly 55 comprises at least one thermoplastic ring 56 having an inner diameter 61 (See FIGS. 17 and 18) dimensioned and arranged to sealingly engage valve stem 28 and an outer diameter 63 dimensioned and arranged to sealingly engage inner diameter 33 of packing bore 32, and opposing annular surfaces 65 and 67 dimensioned and arranged to physically engage annular surfaces 75 and 77 of the sealing ring assembly 57. In an embodiment, sealing ring assembly 57 comprises an outer sealing ring 58a having an inner annular surface 75 in physical contact with an outer annular surface 67 of thermoplastic ring assembly 55, and an inner sealing ring 58b having an outer annular surface 77 in physical contact with an inner annular surface 65 of thermoplastic ring assembly 55, wherein each sealing ring 58a and 58b has an inner diameter 80 (See FIGS. 12 and 13) dimensioned and arranged to sealingly engage valve stem 28 and an outer diameter 85 dimensioned and arranged to sealingly engage inner diameter 33 of packing bore 32.

In an embodiment, anti-extrusion ring assembly 59 comprises at least one upper or outer anti-extrusion ring 60a having an inner annular surface 81 in physical contact with an outer annular surface 77 of outer sealing ring 58a.

In an embodiment, as shown in FIG. 19, anti-extrusion ring assembly 59 may further comprise an inner or lower anti-extrusion ring 60b having an outer annular surface 81 in physical contact with an inner annular surface 75 of inner sealing ring 58b and an outer annular surface 83 in physical contact with valve body 12. Accordingly, as shown in FIG. 19, outer anti-extrusion ring 60a may be identical to inner anti-extrusion ring 60b, and may be arranged in valve packing assembly 59 rotated 180° perpendicular to a central axis. Likewise, sealing ring 58a may be identical to sealing ring 58b, and the determination of inner (also referred to as lower) and outer (also referred to as upper) is merely in relation to the proximity of the surface to inner end, also referred to as the first end 30 of valve stem 28. The inner or lower position being closer in proximity to the inner end or first end 30 compared to the outer or upper counterpart. As is further shown in FIG. 19, anti-extrusion ring assembly 59 may further comprise a top anti-extrusion ring 64, and/or a plurality of rings which may be in contact with packing gland 50, as shown in FIGS. 1 and 16.

In an embodiment, sealing rings 58a and 58b have a hardness which is greater than the hardness of thermoplastic rings 56, and/or the anti-extrusion rings 60a, 60b, and 64, may have a hardness which is greater than a hardness of the sealing rings 58a and 58b.

In an embodiment, the thermoplastic rings and/or the sealing rings may comprise an engineering thermoplastic selected from the group consisting of a polycarbonate resin, a polyamide resin, a polyester resin, a polyether ether ketone resin, a polyacrylate resin, a polybutylene naphthalate resin, a liquid crystal polyester, a polyoxalkylene diimide diacid/polybutyrate terephthalate copolymer, a nitrile resin, polyoxymethylene resin, a styrene-acrylonitrile copolymer, a methacrylonitrile-styrene copolymer, a methacrylonitrile-styrene-butadiene copolymer; an acrylate resin, a polyvinyl acetate, a polyvinyl alcohol, an olefinic chloride or other halide resin, a fluoride resin, a cellulose resin, a polyimide resin, a polysulfone resin, a polyacetal resin, a polylactone resin, a polyketones, a polyphenylene oxide resin, a polyphenylene oxide/polystyrene resin, a polyphenylene sulfide resin, a styrene resin, an acrylonitrile-butadiene-styrene resin, a polyolefin resin, and a combination thereof.

Suitable engineering thermoplastics for use herein include polycarbonates, such as poly(bisphenol-a carbonate); polyamide resins, such as nylon 6 (N6), nylon 66 (N66), nylon 46 (N46), nylon 11 (N11), nylon 12 (N12), nylon 610 (N610), nylon 612 (N612), nylon 6/66 copolymer (N6/66), nylon 6/66/610 (N6/66/610), nylon MXD6 (MXD6), nylon 6T (N6T), nylon 6/6T copolymer, nylon 66/PP copolymer, and nylon 66/PPS copolymer; polyester resins, such as polybutylene terephthalate (PBT), polyethylene terephthalate (PET), polyethylene isophthalate (PEI), PET/PEI copolymer, polyether ether ketone (PEEK), polyacrylate (PAR), polybutylene naphthalate (PBN), liquid crystal polyester, polyoxalkylene diimide diacid/polybutyrate terephthalate copolymer, and other aromatic polyesters; nitrile resins, such as polyacrylonitrile (PAN), polymethacrylonitrile, polyoxymethylene (POM), also known as acetal, [1] polyacetal, and polyformaldehyde (Delrin™), styrene-acrylonitrile copolymers (SAN), methacrylonitrile-styrene copolymers, and methacrylonitrile-styrene-butadiene copolymers; acrylate resins, such as polymethyl methacrylate and polyethylacrylate; polyvinyl acetate (PVAc); polyvinyl alcohol (PVA); chloride resins, such as polyvinylidene chloride (PVDC), and polyvinyl chloride (PVC); fluoride resins, such as polyvinylidene fluoride (PVDF), polyvinyl fluoride (PVF), polychlorofluoroethylene (PCFE), and polytetrafluoroethylene (PTFE); cellulose resins, such as cellulose acetate and cellulose acetate butyrate; polyimide resins, including aromatic polyimides; polysulfones; polyacetals; polylactones; polyketones, including aromatic polyketones; polyphenylene oxide; polyphenylene oxide/polystyrene (Noryl), polyphenylene sulfide; styrene resins, including polystyrene, styrene-maleic anhydride copolymers, and acrylonitrile-butadiene-styrene (ABS) resin, polyolefins such as high density polyethylene, ultrahigh molecular weight polyethylene, combinations thereof, and the like.

In an embodiment, the thermoplastic rings of the valve stem packing comprise a thermoplastic resin selected from the group consisting of polyvinyl fluoride (PVF), polychlorofluoroethylene (PCFE), polytetrafluoroethylene (PTFE); and combinations thereof. In an embodiment, the sealing rings of the valve stem packing comprise a thermoplastic resin selected from the group consisting of a polyamide, polyphenylene oxide/polystyrene, polyoxymethylene (POM), polyether ether ketone (PEEK), and combinations thereof.

In an embodiment, the thermoplastic rings of the valve stem packing may have a Rockwell R hardness determined according to ASTM D785 or an equivalent thereof, which is less than the Rockwell R hardness of the sealing rings. In and embodiment, the Rockwell R hardness of the sealing rings is less than the Rockwell R hardness of the anti-extrusion rings. In and embodiment, the thermoplastic rings of the valve stem packing may have a Rockwell R hardness of less than or equal to about 100R, or less than or equal to about 90R, or less than or equal to about 80R, or less than or equal to about 70R, or less than or equal to about 60R, or less than or equal to about 50R, or less than or equal to about 40R, or less than or equal to about 30R, or less than or equal to about 20R, or less than or equal to about 15R.

In an embodiment, the sealing rings of the valve packing may have a Rockwell R hardness of greater than about 100R, or greater than or equal to about 105R, or greater than or equal to about 110R, or greater than or equal to about 115R, or greater than or equal to about 120R, or greater than or equal to about 125R, or greater than or equal to about 130R determined according to ASTM D785 or an equivalent thereof.

In an embodiment, the Rockwell R hardness of any one of the sealing rings of the valve packing may be greater than the Rockwell R hardness of any one of the thermoplastic rings of the valve packing by at least 50R units, or by at least 60R units, or by at least 70R units, or by at least 80R units, or by at least 90R units, or by at least 100R units, or by at least 110R units determined according to ASTM D785 or an equivalent thereof.

In an embodiment, the anti-extrusion rings of the valve stem packing, which include the upper anti-extrusion ring, the lower anti-extrusion ring, and/or the top anti-extrusion ring, may comprise brass, steel, titanium, silicon carbide, an at least partially austenitic steel alloy, or a combination thereof.

In an embodiment, the anti-extrusion rings of the valve stem packing comprise an austenitic iron alloy further comprising chromium, nickel, manganese, silicone, nitrogen, carbon, molybdenum, titanium, niobium, or a combination thereof. Suitable examples include various stainless steels (SS) including XM-19, 303, 304/304L, 309, 310, 321, 347, 410, 416, Inconel 718, 15-5, 17-4PH, 17-4 H1025, 17-4 H1075, 17-4 H1150, 17-4 HH1150, NITRONIC 50, NITRONIC 60, A286, and combinations thereof.

In an embodiment, the anti-extrusion rings of the valve stem packing comprise an austenitic steel alloy comprising iron, chromium, nickel, manganese, silicone, and nitrogen. Suitable examples include Nitronic 50 and Nitronic 60 stainless steel.

As shown in FIGS. 8-11, in an embodiment, the top anti-extrusion ring 64 has an inner diameter 72 which is greater than or equal to the inner diameter 74 of the upper or lower anti-extrusion ring 60a or 60b. In an embodiment, at least one of the anti-extrusion rings e.g., the top anti-extrusion ring 64, the upper anti-extrusion ring 60a and/or the lower anti-extrusion ring 60b comprise a chamfer 76 along an outer radial edge 78 of a first side 79 of the anti-extrusion ring 60. In an embodiment, the plurality of rings in the valve stem packing assembly 52 are arranged such that the first side 79 of the anti-extrusion ring 60 is oriented in physical contact with sealing ring 58.

In an embodiment, the upper anti-extrusion ring 60a, the lower anti-extrusion ring 60b, or both comprise a chamfer 76 along an outer radial edge 78 thereof.

As shown in FIGS. 9 and 13, in an embodiment, the upper anti-extrusion ring 60a and the lower anti-extrusion ring 60b have an inner diameter 74 which is greater than or equal to the inner diameter 80 of the sealing rings 58, the inner diameter 61 of the thermoplastic rings 56 (FIG. 18), or both.

As shown in FIG. 1, fluid flow passage 14 includes an inlet seat 82 and an outlet seat 84. The seats 82 and 84 are spherically shaped to cooperate with the flow control element or ball 16, forming seals against ball 16. Ball 16 is secured in fluid flow passage 14 between inlet seat 82 and outlet seat 84, and may be spaced from the bottom of the fluid passage 86 in a floating arrangement.

As shown in FIG. 1, in an embodiment, a spring 88 may be positioned between inlet seat 82 and valve body 12 to secure ball 16 between the seats 82 and 84. In an embodiment, spring 88 may be disposed within a recess 96 located between the inlet seat 88 and valve body 12, wherein recess 96 and spring 88 have an outer diameter which is less than an outer diameter 88 of the inlet seat 82.

Figure 3:
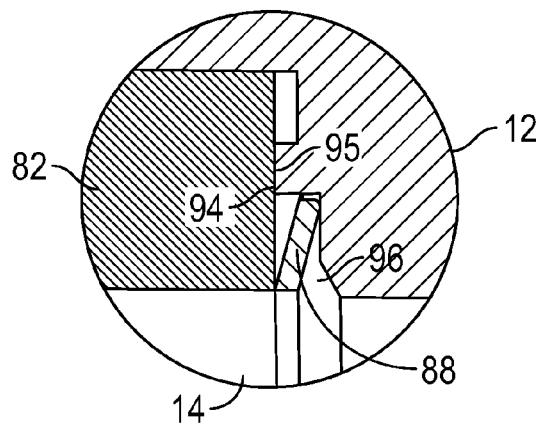
FIG. 3 is an exploded view of Section 3 shown in FIG. 1.

As best seen in FIG. 3, in an alternative embodiment, a spring 88 may be positioned between inlet seat 82 and valve body 212 and/or between outlet seat 84 and valve body 212 to secure ball 16 between the seats 82 and 84.

Inlet seat 82 and outlet seat 84 may be constructed from metal, preferably from the same material as ball 16, and may be at least partially formed during production, e.g., via lapping or other similar processes, such that each ball 16, inlet seat 82 and outlet seat 84 are individually matched to each other as a set.

In an embodiment, at least a portion of the outer surface of the flow control element, the inner surface of the packing bore, the fluid flow bore, the valve stem, the inner annular surface of the inlet valve seat, the outer annular surface of the inlet valve seat, the inner annular surface of the outlet valve seat, the outer annular surface of the outlet valve seat, the anti-extrusion ring, or a combination thereof may include a spray and fuse coating comprising metals from Groups 6-12 of the periodic table of the elements alone, or in compounds comprising elements from Groups 13-16 of the period table of the elements. Examples include chromium carbide, tungsten carbide, chromium oxide, chromium nitride, chromium boride, alone, or in combination with Mo, Ni, Cu, and the like. Suitable examples include Colmonoy™ 5, 6, 43, 50, 56, 63, 69, 72, 88, 225, 226, 227 (Wall Colmonoy Corp., Michigan, USA) and the like.

As shown in FIGS. 5-7, inlet seat 82 (and/or outlet seat 84) may be essentially identical, and comprise a sealing face 90 located on an inner annular surface 91 of each seat which sealing engages ball 16. In an embodiment, inlet seat 82, outlet seat 84, or both comprise a plurality of vent grooves 98 laterally disposed between sealing face 90 and an outer radial edge 100, and/or an inner edge 101 of the seat to provide fluid communication between sealing face 90 and outer radial edge 100 and/or the inner radial edge 101 of the seat. In an alternative embodiment, the valve seat may comprise a sealing face located near the outer radial edge which may comprise a plurality of vent grooves laterally disposed between the sealing face and the inner radial edge of the seat.

In an embodiment, at least a portion of the inner annular surface 91 of inlet valve seat 82, the inner annular surface 99 of outlet valve seat 84, or a combination thereof, comprise a sealing face 90 dimensioned and arranged to sealingly engage a portion of the outer surface 15 of the fluid control element 16. In an embodiment, at least a portion of inner annular surface 91 of inlet valve seat 82, inner annular surface 99 of outlet valve seat 84, or a combination thereof, comprise a plurality of support surfaces 115 dimensioned and arranged in physical contact with outer surface 15 of the fluid control element 16 when assembled in flow control assembly 13. In an embodiment, support surfaces 115 are located adjacent to sealing face 90, and may be separated from sealing face 90 by annular grooves 117. In an embodiment, inner valve seat 82, outer valve seat 84, or a combination thereof comprise a plurality of vent grooves 98 laterally disposed into inner annular surface 91 and/or 99 of valve seats 82 and/or 84 between each of the plurality of support surfaces 115 and an outer radial edge 100 of the valve seat, an inner radial edge 92 of the valve seat, or a combination thereof.

In an embodiment, vent grooves 98 are disposed into inner annular surface 91 and/or 99 in an amount sufficient to prevent spreading of cracks which may occur in a coating applied to inner annular surface 91 and/or 99, e.g., a spray and fuse coating 131, and/or which may act as a stopping point for cracks which may occur in a coating applied to inner annular surface 91 and/or 99, or the like.

As shown in FIG. 3, inlet valve seat 82, also referred to herein as inlet seat 82, may comprise an outer sealing surface 94 dimensioned and arranged to sealingly engage with a portion of the valve body 12 located on the upstream side, also referred to herein as an inlet side or inlet end 66 side of ball 16.

Figure 4:
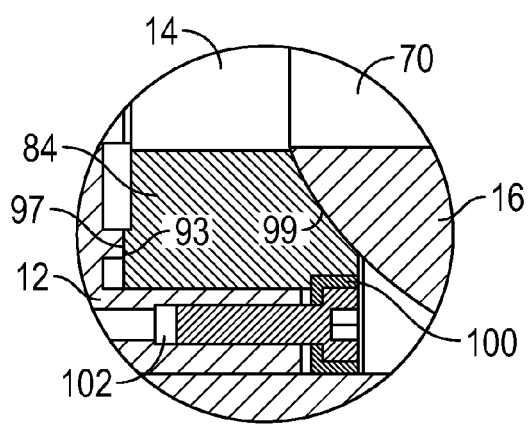
FIG. 4 is an exploded view of Section 4 shown in FIG. 1.

As shown in FIG. 4, outlet seat 84 (or outlet valve seat 84) may comprise an outer sealing surface 93 dimensioned and arranged to sealingly engage a portion of the valve body 97 located on the downstream or outlet side 68 of ball 16. Accordingly, in an embodiment, the valve may be a bidirectional valve.

As shown in FIG. 4, in an embodiment, outlet seat 84 may be attached to valve body 12 using a plurality of threaded members 102 engaged with an outer radial edge 100 of outlet seat 84 and valve body 12.

In another embodiment, as shown in FIGS. 23 to 27B, wherein like numerals are used to refer to like parts from FIGS. 1-22, a valve body 12' comprises a fluid flow bore 14 disposed therethrough having an inlet end 66, an outlet end 68 and a flow control assembly 13' located within a portion of the fluid flow bore 14. The flow control assembly 13' comprises a flow control element 16 disposed between, and having an outer surface 15 for sealing contact with, an inner annular surface 91 of an inlet valve seat 82' and an inner annular surface 99 of an outlet valve seat 84, wherein the flow control element 16 is rotatable between an open and a closed position. For purposes of this embodiment, the terms "inner" (toward) and "outer" (away from) are with respect to the flow control element 16, whereas "outside" and "inside" are with respect to an axis of the flow bore 14. As best seen in FIGS. 24A and 24B, Belleville spring 88 biases the inlet valve seat 82' against the flow control element 16.

A valve stem 28 extends from an outer end 34 (with respect to the flow control element) through a packing bore 32 disposed radially around the valve stem in the valve body 12' to an inner end 30 (with respect to the flow control element) of the valve stem rotationally engaging a recess 104 (see FIG. 15) disposed in the flow control element 16.

In some embodiments, an inlet sealing face 90 (see FIG. 5) on a portion of the inner annular surface 91 of the inlet valve seat 82' is dimensioned and arranged to physically contact and sealingly engage a portion of the outer surface 15 of the fluid flow control element 16. A first plurality of support surfaces 115 adjacent the inlet sealing face 90 are dimensioned and arranged to physically contact the outer surface 15 of the fluid flow control element 16, and a first plurality of respective vent grooves 117 is disposed between adjacent ones of the first plurality of support surfaces 115, and between the first plurality of support surfaces 115 and the inlet sealing face 90.

In some alternate or additional embodiments, a compression spring member 130 has inner and outer annular sealing surfaces (with respect to the flow control element) on opposite sides thereof to seal against respective inner and outer sealing surfaces 132, 95' to form a first fluid seal between the inlet valve seat 82' and the valve body 12' when a first pressure is applied to the outlet end 66 of the fluid flow bore 14 to compress the spring member 130. In some embodiments, an outer annular surface 94' of the inlet valve seat 82' adjacent to the annular sealing surfaces of the compression spring member 130, and opposing a surface of the valve body 95' to form a second fluid seal between the inlet valve seat 82' and the valve body 12' when a second pressure that is higher than the first pressure is applied to the outlet end of the fluid flow bore.

In some embodiments, the first fluid seal can function as a low pressure or secondary seal when, for example, the second fluid seal is a high pressure or primary seal for ultra-high pressure, e.g., up to 40,000 psi, but may leak excessively at lower pressures, e.g., below 15,000 psi, or below 12,500 psi, or below 10,000 psi, or below 7500 psi, or below 5000 psi, etc. For example, in some embodiments, the spring member 130 is compressed between the inner and outer annular sealing surfaces, as the applied pressure is increased up to the first pressure to form the first fluid seal, and this compression and seal may occur before the outer annular surface 94' of the inlet valve seat 82' and the opposing surface 95' of the valve body 12' form the second fluid seal. Preferably, the first fluid seal is formed at lower pressures at which the second fluid seal might not prevent fluid leakage, especially gas leakage, and the second fluid seal is formed before exceeding a pressure at which the first fluid seal might otherwise leak and thus a fluid-tight seal is maintained at all pressures and there is an overlap of sealing pressures, and/or the first and second seals may only allow a relatively moderate or low leak rate, e.g., 0.1 to 10 SCFM per 10 psi pressure differential between the (high pressure) outlet end and the (low pressure) inlet end.

In some embodiments, an inside diameter of the compression spring member 130 is greater than an outside diameter of the outer annular surface 94' of the inlet valve seat 12', and/or an inside diameter of the outer annular surface 94' of the inlet valve seat 12' is greater than an outside diameter of the Bellville spring 88. For example, the annular surfaces 94', 95' may form a seal disposed radially between the Belleville spring 88 and the compression spring member 130. In some embodiments, surface 132 is disposed in a recess formed at a radial edge, e.g., an outside radial edge, of the outer end of the inlet valve seat 82', and/or a recess may be formed in an outside radial edge of the surface 95' (not shown), to receive the compression spring member 130.

Figure 24A:
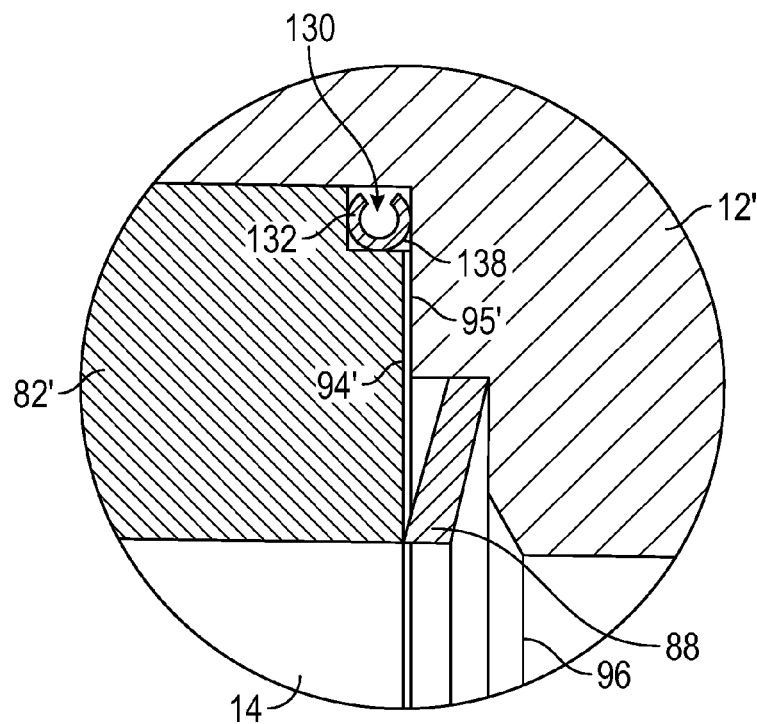
FIG. 24A is a view of Section 24 shown in FIG. 23 with the secondary seal ring at minimal compression.
Figure 24B:
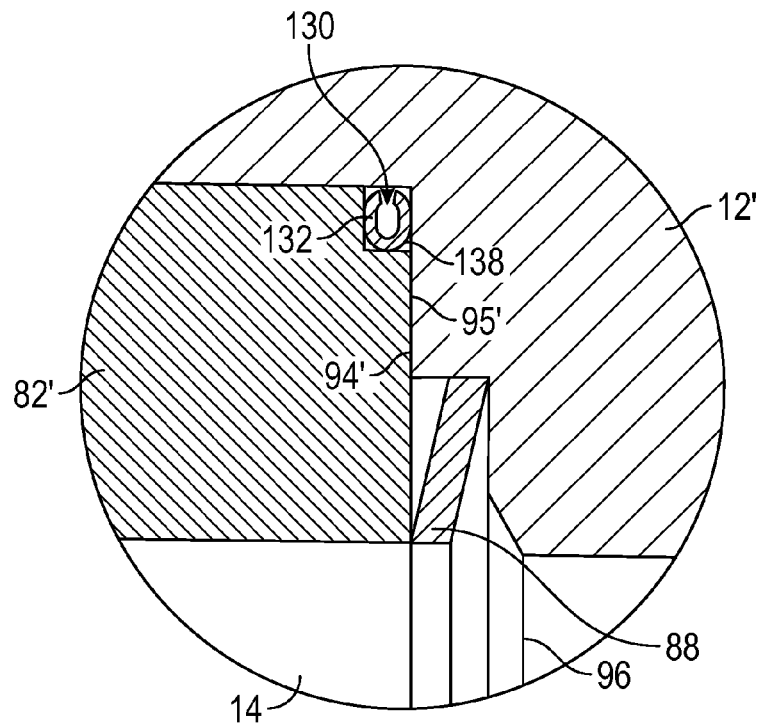
FIG. 24B is a view of Section 24 shown in FIG. 23 with the secondary seal ring in a state of compression.
Figure 25:
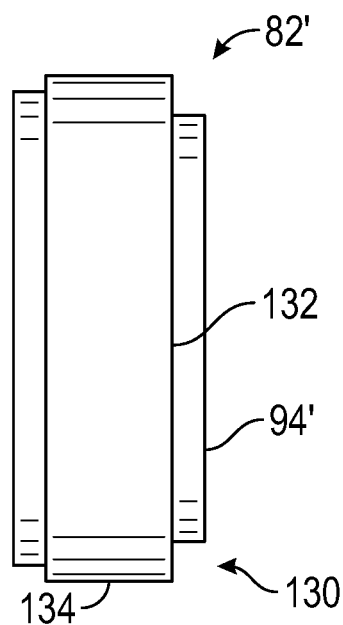
FIG. 25 is a side view of the inlet valve seat shown in FIG. 23.
Figure 26:
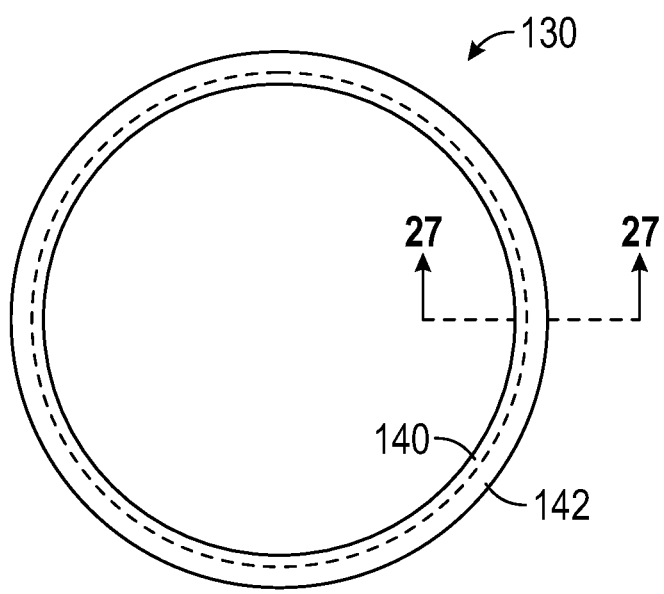
FIG. 26 is a perspective end view of the secondary seal ring shown in FIG. 23.
Figure 27A:
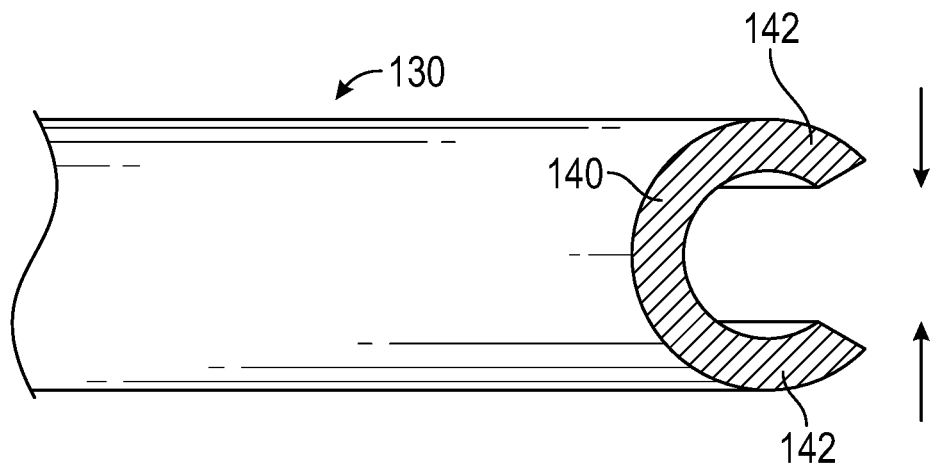
FIG. 27A is a sectional view of the secondary seal ring as seen along the view lines 27-27 in FIG. 26 with the secondary seal ring in a relaxed (uncompressed) condition.
Figure 27B:
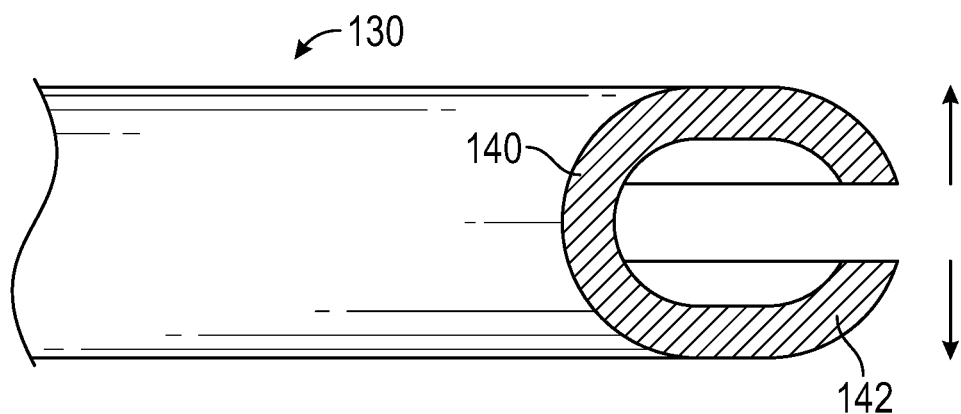
FIG. 27B is a sectional view of the secondary seal ring as seen along the view lines 27-27 in FIG. 26 with the secondary seal ring in a compressed condition.

In some embodiments, the compression spring member 130 is toroidal (see FIGS. 26, 27A, and 27B) and the torus has an arcuate minor profile (see FIGS. 27A and 27B), and or the minor profile comprises inner and outer leg portions 142 extending radially away from a crown 140. For example, the legs 142 may spring outwardly with respect to a plane bisecting the crown 140, as the legs 142 extend away from an apex of the crown 140 toward free ends to a point where the surfaces of the legs 142 abut the surfaces 132, 95', when the compression spring member is in a relaxed condition as illustrated in FIGS. 24A and 27A; and the compression of the spring member 130 may reduce a distance between the inner and outer surfaces of the legs 142 (FIG. 27B) until the surfaces 94', 95' abut as seen in FIG. 24B. In some embodiments, the crown 140 has a diameter with respect to a major axis of the torus, e.g., the axis of the flow bore 14, that is less than diameters at the free ends of the inner and outer legs 142, i.e., the legs 142 extend radially outward away from the major axis. Preferably the spring member 130 is made of a memory material that retains its original shape (FIGS. 24A, 27A) after being compressed (FIGS. 24B, 27B). In embodiments, sealing member 130 comprises an austenite nickel-chromium-based alloy, referred to in the art as a superalloy. Suitable materials include various Hastelloy® alloys, Inconel® alloys, Monel alloys, Nitronic® alloys, Incoloy® alloys, HPA Cobalt® alloys, Haynes® alloys, and the like.

In some embodiments, in the valve of FIGS. 23 to 27B, an outlet sealing face 90 (see FIG. 5) on a portion of the inner annular surface of the outlet valve seat 82' is also dimensioned and arranged to sealingly engage a portion of the outer surface of the fluid flow control element; a second plurality of support surfaces 115 adjacent the outlet sealing face 90 are dimensioned and arranged to physically contact the outer surface of the fluid flow control element; and a second plurality of respective vent grooves 98, 117 disposed between adjacent ones of the second plurality of support surfaces, and between the first plurality of support surfaces 115 and the outlet sealing face 131.

In some embodiments, in the valve of FIGS. 23 to 27B, the lateral movement of the fluid flow control element 16 in the bore 14 allows sealing contact between an outer annular surface 94' of the inlet valve seat 82' and the valve body 12', and/or at the opposing inner and outer surfaces of the compression spring member 130, when pressure 121 is applied to the outlet end 68 of the fluid flow bore (see FIGS. 24B, 27B); and sealing contact between an outer surface of the fluid flow control element 16 and outlet valve seat 84 when pressure 120 is applied to the inlet end 66 of the fluid flow bore 14 (see FIGS. 24A, 27A).

In embodiments, the sealing member 130 is dimensioned and arranged to provide sealing contact upon application of reversed pressure 121 from the outlet end 68 towards the inlet end 66, which is less than the force resultant from the forward pressure 120 applied in the reverse direction from the inlet end 66 towards the outlet end 68. Accordingly, in embodiments, valve 10' is differentially bidirectional, providing sealing contact without leaking or allowing fluid flow in a forward direction from the inlet end 66 to the outlet end 68 at a first applied forward pressure 120 and/or reverse pressure 121, and providing sealing contact without leaking in a reverse direction from the outlet end 68 to the inlet end 66 at a second applied reverse pressure 121.

In embodiments, the valve 10' does not leak or allow for forward or reverse flow when in the off position, regardless of which pressure 120, 121 is greater, at a pressure differential between the inlet pressure 120 and the outlet pressure 121, that is greater than 68.9 MPa (10,000 psi), or greater than 137.9 MPa (20,000 psi), or greater than 206.8 MPa (30,000 psi), or greater than 275.8 MPa (40,000 psi), or greater than 310.2 MPa (45,000 psi), or greater than 344.7 MPa (50,000 psi). In some embodiments, sealing contact is maintained in the valve 10', i.e., the valve 10' does not leak or allow for forward or reverse flow in the off position, for at least 1 hour, or for at least 5 hours, or for at least 24 hours, at a fluid temperature of greater than or equal to about 200° C., or greater than or equal to about 300° C., or greater than or equal to about 400° C., preferably when the fluid is a gas. In some embodiments, the fluid is a gas. In embodiments, valve 10' does not leak after a total of at least 5 cycles, or at least 10 cycles, or at least 100 cycles or at least 1000 cycles between the "on" position allowing flow and the "off" position (i.e., an "on-off" cycle).

In some embodiments, alternatively or preferably in addition to maintaining the high pressure seals just described, the valve 10' does not leak or leak excessively or otherwise allow reverse flow of gas in an amount exceeding 100 cm$^3$/min (0.0035 SCFM) when in the off position, when the outlet end pressure 121 is greater than the inlet end pressure 120, at a low pressure differential between the inlet pressure 120; e.g., a seal or low leakage is maintained at the seal 130 over a reverse direction pressure differential range of from a low end of 0.689 MPa (100 psi), 6.89 MPa (1000 psi), or 1.38 MPa (2000 psi), up to a higher end of at least 34.5 MPa (5,000 psi), 51.7 MPa (7,500 psi), or 68.9 MPa (10,000 psi). In the context of valve 10' herein, "low pressure" or "low pressure differential" refers to a differential outlet pressure 121 above the inlet pressure 120 that is sufficient for the pressure 121 on the flow control element 16 to overcome the biasing force of the Belleville spring 88 and move the flow control element laterally in an amount to disengage the seal between the outlet valve seat and the flow control element, but not sufficient to engage the seal between the inlet valve seat 82' and the valve body 12' at the surfaces 94', 95'. Preferably the low pressure seal or nominal leakage rate is maintained for at least 1 hour when the fluid is a gas at a temperature of greater than or equal to about 200° C., or greater than or equal to about 300° C., or greater than or equal to about 400° C. In some embodiments, the fluid is a gas. In embodiments, valve 10' does not leak in the low pressure range after a total of at least 5 cycles, or at least 10 cycles, or at least 100 cycles or at least 1000 cycles between the "on" position allowing flow and the "off" position (i.e., an "on-off" cycle).

In some embodiments, in the valve of FIGS. 23 to 27B, a spray and fuse coating as described above is applied on the inlet sealing face and the first plurality of support surfaces, and/or on the inlet and outlet sealing faces and the first and second plurality of support surfaces, the spray and fuse coating comprising metals from Groups 6-12 of the periodic table of the elements alone, or in compounds comprising elements from Groups 13-16 of the periodic table of the elements.

In some embodiments, in the valve of FIGS. 23 to 27B, a shoulder on the valve stem with an enlarged outer diameter is formed on the valve stem wherein the outside diameter of the shoulder is greater than an inside diameter of a portion of the valve body, a portion of a bracket attached to the valve body, a bushing attached to the valve body, or a combination thereof disposed around the valve stem between the outer end of the valve stem and the shoulder.

In some embodiments, in the valve of FIGS. 23 to 27B, the outlet valve seat is attached to the valve body using a plurality of threaded members, radially spaced about an outer radial edge of the outlet valve seat, and engaged with the outlet valve seat and the valve body.

In some embodiments, the valve of FIGS. 23 to 27B may comprise a valve stem packing system comprising: a plurality of packing rings disposed in the packing bore, the packing rings having an inner diameter disposed around the valve stem and an outer diameter disposed adjacent a cylindrical surface of the packing bore; an inner anti-extrusion ring in the packing bore between the packing rings and an inner end of the packing bore; and an outer anti-extrusion ring in the packing bore between the packing rings and a packing gland.

Figure 15:
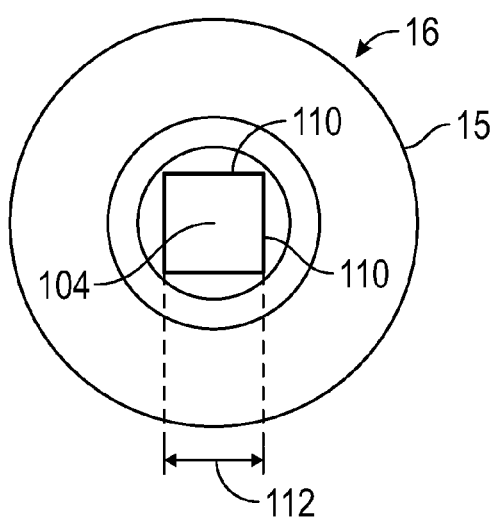
FIG. 15 is a top view of the flow control element according to an embodiment of the instant disclosure.

In all embodiments, as shown in FIG. 15, valve stem 28 may engage ball 16 in a recess 104 dimensioned and arranged to receive valve stem first end 30. In an embodiment recess 104 disposed in the flow control element, e.g., ball 16, is dimensioned and arranged to receive the valve stem first end 30, wherein recess 104 is oversized relative to the valve stem first end 30 by an amount sufficient to allow movement of the flow control element, e.g., ball 16 towards either end of the fluid flow bore when an amount of pressure is applied to an opposite end of the fluid flow bore. As used herein the recess 104 is "oversized" relative to first end 30, which refers to the outer diameter of recess 104 being intentionally made larger than the inner diameter of first end 30 by an amount greater than normal tolerances would require. In other words, the fit is purposely "loose" as is well understood by one of minimal skill in the art.

Figure 14A:
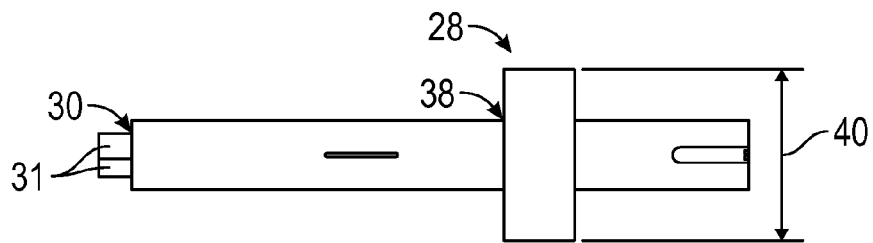
FIG. 14A is a side view of a valve stem according to an embodiment of the instant disclosure.
Figure 14B:
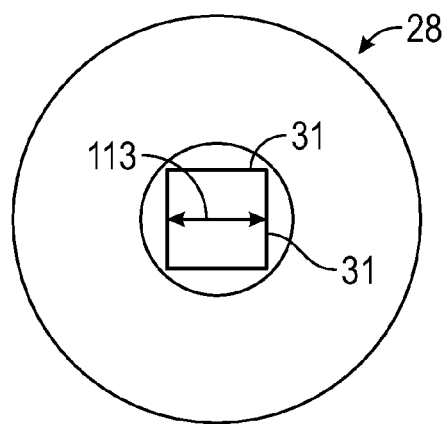
FIG. 14B is a bottom-up view of the valve stem shown in FIG. 14A.

Accordingly, in an embodiment, valve stem 28 extends from outer end 34 through packing bore 32 disposed radially around valve stem 28 in valve body 12 to inner end 30 of valve stem 28. As shown in FIGS. 14A and 14B, in an embodiment, inner end 30 of valve stem 28 comprises a plurality of sides 31 dimensioned and arranged to rotationally engage a corresponding recess 104 (See FIGS. 15, 20-22) having a corresponding number of sides 110 disposed into flow control element 16, wherein a distance 112 between the sides 110 of recess 104 are dimensioned relative to a distance 113 between the plurality of sides 31 of first end 30, also referred to as inner end 30, of valve stem 28 to allow for an amount of lateral movement 114 (see FIG. 1) of flow control element 16 laterally between fluid flow bore inlet end 66 and fluid flow bore outlet end 68 such that a pressure applied to inlet end 66, represented in FIGS. 1 and 20 by arrow 120, results in lateral movement 114 of flow control assembly 13 towards the outlet end 68 of the fluid flow bore 14 (see FIG. 21) in an amount sufficient to produce sealing contact between outer annular surface 93 of outlet valve seat 84 with a portion of the valve body 97, and/or such that a pressure applied to outlet end 68 of fluid flow bore 14 represented in FIGS. 1 and 20 by arrow 121, results in lateral movement 114 of flow control assembly 13 towards inlet end 66 of fluid flow bore 14 (see FIG. 20) in an amount sufficient to produce sealing contact between an outer annular surface 94 of inlet valve seat 82 and a portion 95 of valve body 12. In an embodiment, distance 112 between the sides 110 of recess 104 are dimensioned relative to distance 113 between the plurality of sides 31 of first end 30 to allow for an amount of lateral movement 114 of flow control element 16 between fluid flow bore inlet end 66 and fluid flow bore outlet end 68 of less than or equal to about 0.3 mm, or 0.2 mm or 0.1 mm, or 0.05 mm, or 0.01 mm, or 0.005 mm, or 0.001 mm.

In an embodiment, the valve stem comprises a metal alloy heat treated to greater than or equal to about 1034 MPa (150 kpsi) yield as determined by ASTM C774 or an equivalent thereof.

In an embodiment, at least a portion of a surface of the flow control element 16, a surface of the valve stem 28, a surface of the packing bore 32, a surface of the flow bore 14, or any combination thereof has a surface roughness from about 1 to 50 root mean square in micro-inches, or from about 2 to 25 root mean square in micro-inches, or from about 5 to 20 root mean square in micro-inches.

In an embodiment, a method comprises providing a bidirectional valve according to any one, or any combination of embodiments disclosed herein; rotating the valve stem such that the control element is in the closed position prior to or after applying a pressurized fluid having a pressure of greater than 275.8 MPa (40,000 psi) and a temperature of greater than or equal to about 200° C. to the inlet end of the fluid flow bore or to the outlet end of the fluid flow bore and maintaining the pressure and temperature for at least 1 hour, wherein the fluid is maintained by the valve without leaking. In an embodiment, the method my comprise rotating the valve stem such that the control element is in the closed position and prior to or before rotating the valve stem to close the valve, applying a pressurized fluid having a pressure of greater than 275.8 MPa (40,000 psi), or greater than 310.2 MPa (45,000 psi), or greater than 344.7 MPa (50,000 psi), at a temperature of greater than or equal to about 200° C., or greater than or equal to about 300° C., or greater than or equal to about 400° C., to the fluid flow bore, and maintaining the pressure and temperature for at least 1 hour, or for at least 5 hours, or for at least 24 hours, wherein the fluid is maintained by the valve without leaking, or wherein the fluid is maintained by the valve without leaking after a total of 5 cycles between the "on" position allowing flow and the "off" position which does not allow flow, or wherein the fluid is maintained by the valve without leaking after a total of 50 cycles, or wherein the fluid is maintained by the valve without leaking after a total of 1000 cycles. Accordingly, the bidirectional ball valve according to any one or any combination of embodiments disclosed herein may be suitable for use under extremely high pressures (i.e., greater than 40,000 psi), and high temperatures (i.e., greater than or equal to about 200° C.).

In an embodiment, a method comprises providing a bidirectional valve a valve body comprising an axial fluid flow bore disposed therethrough having an inlet end located opposite an outlet end and a flow control assembly located within a portion of the fluid flow bore, the flow control assembly comprising a flow control element disposed between, and having an outer surface in sealing contact with an inner annular surface of an inlet valve seat and an inner annular surface of an outlet valve seat, wherein the flow control element is rotatable between an open and a closed position; a valve stem extending from an outer end through a packing bore disposed radially around the valve stem in the valve body to an inner end of the valve stem, wherein the inner end of the valve stem comprises a plurality of sides dimensioned and arranged to rotationally engage a corresponding recess having a corresponding number of sides disposed into the flow control element, wherein a distance between the sides of the recess are dimensioned relative to a distance between the plurality of sides of the inner end of the valve stem to allow for an amount of lateral movement of the flow control element laterally between the fluid flow bore inlet end and the fluid flow bore outlet end such that a pressure applied to the inlet end of the fluid flow bore results in lateral movement of the flow control assembly towards the outlet end of the fluid flow bore in an amount sufficient to produce sealing contact between an outer annular surface of the outlet valve seat with a portion of the valve body, such that a pressure applied to the outlet end of the fluid flow bore results in lateral movement of the flow control assembly towards the inlet end of the fluid flow bore in an amount sufficient to produce sealing contact between an outer annular surface of the inlet valve seat and a portion of the valve body, or a combination thereof, wherein at least a portion of the inner annular surface of the inlet valve seat, the inner annular surface of the outlet valve seat, or a combination thereof, comprise a sealing face dimensioned and arranged to sealingly engage a portion of the outer surface of the fluid control element, and wherein at least a portion of the inner annular surface of the inlet valve seat, the inner annular surface of the outlet valve seat, or a combination thereof, comprise a plurality of support surfaces dimensioned and arranged in physical contact with the outer surface of the fluid control element adjacent the sealing face; rotating the valve stem such that the control element is in the closed position prior to or after applying a pressurized fluid having a pressure of greater than 275.8 MPa (40,000 psi) and a temperature of greater than or equal to about 200° C. to the inlet end of the fluid flow bore or to the outlet end of the fluid flow bore and maintaining the pressure and temperature for at least 1 hour, wherein the fluid is maintained by the valve without leaking.

In an embodiment, the method may further comprise providing a bidirectional valve comprising a valve stem packing system comprising a plurality of packing rings having an inner diameter dimensioned to be disposable around the valve stem, and an outer diameter dimensioned to be locatable within an inner diameter of the packing bore disposed radially around the valve stem in the valve body, wherein the packing system comprises a thermoplastic ring assembly sandwiched between, and in physical contact with a sealing ring assembly sandwiched between, and in physical contact with an anti-extrusion ring assembly and the valve body, wherein the thermoplastic ring assembly comprises at least one thermoplastic ring having an inner diameter dimensioned and arranged to sealingly engage the valve stem and an outer diameter dimensioned and arranged to sealingly engage the inner diameter of the packing bore, and opposing annular surfaces dimensioned and arranged to physically engage annular surfaces of the sealing ring assembly; wherein the sealing ring assembly comprises an outer sealing ring having an inner annular surface in physical contact with an outer annular surface of the thermoplastic ring assembly, and an inner sealing ring having an outer annular surface in physical contact with an inner annular surface of the thermoplastic ring assembly, wherein each sealing ring has an inner diameter dimensioned and arranged to sealingly engage the valve stem and an outer diameter dimensioned and arranged to sealingly engage the inner diameter of the packing bore; wherein the anti-extrusion ring assembly comprises at least one upper anti-extrusion ring having an inner annular surface in physical contact with an outer annular surface of the outer sealing ring; wherein the sealing rings have a hardness which is greater than a hardness of the at least one thermoplastic ring, and wherein the anti-extrusion ring has a hardness which is greater than a hardness of the sealing rings.

In some embodiments, a method comprises locating a flow control assembly in a fluid flow bore disposed through a valve body, the fluid flow bore having an inlet end and an outlet end, the flow control assembly comprising a flow control element disposed between inlet and outlet valve seats and having an outer surface for sealing contact with an inner annular surfaces of the inlet and outlet valve seats; rotating the flow control element between open and closed positions; applying a pressurized fluid to the inlet end of the fluid flow bore to form a first fluid seal between the flow control element, the outlet valve seat and the valve body; applying a pressurized fluid to the outlet end of the fluid flow bore to form a second fluid seal between a sealing face of the inner annular surface of the inlet valve seat and the outer surface of the fluid flow control element; physically contacting the outer surface of the flow control element with a first plurality of support surfaces located on the inner annular surface adjacent the sealing face of the inlet valve seat; separating adjacent ones of the first plurality of support surfaces with a like plurality of vent grooves on the inner annular surface of the inlet valve seat between adjacent ones of the first plurality of support surfaces; and separating the first plurality of support surfaces from the sealing face of the inlet valve seat with an annular vent groove on the inner annular surface of the inlet valve seat between the respective sealing face and the support surfaces.

In some embodiments, e.g., as in FIGS. 23 to 27B, a method comprises locating a flow control assembly in a fluid flow bore disposed through a valve body, the fluid flow bore having an inlet end and an outlet end, the flow control assembly comprising a flow control element disposed between inlet and outlet valve seats and having an outer surface for sealing contact with an inner annular surfaces of the inlet and outlet valve seats; rotating the flow control element between open and closed positions; applying a pressurized fluid to the inlet end of the fluid flow bore to form a first fluid seal between the flow control element, the outlet valve seat and the valve body; applying a pressurized fluid to the outlet end of the fluid flow bore to form a second fluid seal between a sealing face of the inner annular surface of the inlet valve seat and the outer surface of the fluid flow control element; and applying a first pressure to the outlet end of the fluid flow bore and elastically compressing a spring member having inner and outer annular sealing surfaces (with respect to the flow control element) on opposite sides thereof to form a third fluid seal between the inlet valve seat and the valve body. In some embodiments, the method further comprises applying a second pressure to the outlet end of the fluid flow bore that is higher than the first pressure and forming a fourth fluid seal between an outer annular surface of the inlet valve seat and an opposing surface of the valve body. In some embodiments, the method further comprises physically contacting the outer surface of the flow control element with a first plurality of support surfaces located on the inner annular surface adjacent the sealing face of the inlet valve seat; separating adjacent ones of the first plurality of support surfaces with a like plurality of vent grooves on the inner annular surface of the inlet valve seat between adjacent ones of the first plurality of support surfaces; and separating the first plurality of support surfaces from the sealing face of the inlet valve seat with an annular vent groove on the inner annular surface of the inlet valve seat between the respective sealing face and the support surfaces.

In some of the embodiments, the first pressure is a pressure within the range of from 0.689 MPa (100 psi) up to 68.9 MPa (10,000 psi), and the second pressure is greater than 68.9 MPa (10,000 psi), or preferably greater than 206.8 MPa (30,000 psi). In some embodiments, the method comprises: maintaining the pressurized fluid applied to the outlet end of the fluid flow bore at a pressure of between 6.9 MPa (1000 psi) and 69 MPa (10,000 psi) for at least 1 hour without leaking more than 100 cc/min past the flow control element into the inlet end of the fluid flow bore; and/or maintaining the pressurized fluid applied to the inlet end of the fluid flow bore at a pressure of greater than 206.8 MPa (30,000 psi), or preferably greater than 275.8 MPa (40,000 psi) and a temperature of greater than or equal to about 200° C. for at least 1 hour without leaking past the flow control element into the outlet end of the fluid flow bore; and/or maintaining the pressurized fluid applied to the outlet end of the fluid flow bore at a pressure of greater than 206.8 MPa (30,000 psi), or preferably greater than 275.8 MPa (40,000 psi) and a temperature of greater than or equal to about 200° C. for at least 1 hour without leaking past the flow control element into the inlet end of the fluid flow bore.

Embodiments

Accordingly, the instant disclosure relates to the following embodiments:

A. A bidirectional valve comprising:
  a valve body comprising an axial fluid flow bore disposed therethrough having an inlet end located opposite an outlet end and a flow control assembly located within a portion of the fluid flow bore; the flow control assembly comprising a flow control element disposed between, and having an outer surface in sealing contact with an inner annular surface of an inlet valve seat and an inner annular surface of an outlet valve seat, the flow control element is rotatable between an open and a closed position;
  a valve stem extending from an outer end through a packing bore disposed radially around the valve stem in the valve body to an inner end of the valve stem, the inner end of the valve stem comprising a plurality of sides dimensioned and arranged to rotationally engage a corresponding recess having a corresponding number of opposing sides disposed into the flow control element, a distance between the sides of the recess are dimensioned relative to a distance between the plurality of sides of the first end of the valve stem to allow for an amount of lateral movement of the flow control element between the fluid flow bore inlet end and the fluid flow bore outlet end such that a pressure applied to the inlet end of the fluid flow bore results in lateral movement of the flow control assembly towards the outlet end of the fluid flow bore in an amount sufficient to produce sealing contact between an outer annular surface of the outlet valve seat with a portion of the valve body, and such that a pressure applied to the outlet end of the fluid flow bore results in lateral movement of the flow control assembly towards the inlet end of the fluid flow bore in an amount sufficient to produce sealing contact between an outer annular surface of the inlet valve seat and a portion of the valve body, or a combination thereof B. The bidirectional valve of embodiment A, wherein at least a portion of the inner annular surface of the inlet valve seat, the inner annular surface of the outlet valve seat, or a combination thereof, comprise a sealing face dimensioned and arranged to sealingly engage a portion of the outer surface of the fluid control element, and wherein at least a portion of the inner annular surface of the inlet valve seat, the inner annular surface of the outlet valve seat, or a combination thereof, comprise a plurality of support surfaces dimensioned and arranged in physical contact with the outer surface of the fluid control element adjacent the sealing face.

C. The bidirectional valve of embodiment A or B, wherein the valve stem further comprises a shoulder with an enlarged outer diameter formed on the valve stem wherein the outside diameter of the shoulder is greater than an inside diameter of a portion of the valve body, a portion of a bracket attached to the valve body, a bushing attached to the valve body, or a combination thereof disposed around the valve stem between the outer end of the valve stem and the shoulder.

D. The bidirectional valve of any one of embodiments A-C, wherein the inner valve seat, the outer valve seat, or a combination thereof comprise a plurality of vent grooves laterally disposed into the inner annular surface of the valve seat between each of the plurality of support surfaces and an outer radial edge of the valve seat, an inner radial edge of the valve seat, or a combination thereof.

E. The bidirectional valve of any one of embodiments A-D, wherein at least a portion of the outer surface of the flow control element, the inner surface of the packing bore, the fluid flow bore, the valve stem, the inner annular surface of the inlet valve seat, the outer annular surface of the inlet valve seat, the inner annular surface of the outlet valve seat, the outer annular surface of the outlet valve seat, or a combination thereof includes a spray and fuse coating comprising metals from Groups 6-12 of the periodic table of the elements alone, or in compounds comprising elements from Groups 13-16 of the period table of the elements.

F. The bidirectional valve of any one of embodiments A-E, wherein at least one of the inner valve seat or the outer valve seat is attached to the valve body using a plurality of threaded members engaged with an outer radial edge of the valve seat and the valve body.

G. The bidirectional valve of any one of embodiments A-F, wherein at least a portion of an outer surface of the flow control element, a surface of the valve stem, a surface of the packing bore, a surface of the fluid flow bore, a surface of the valve seat, or a combination thereof has a surface roughness from about 1 to 50 root mean square in micro-inches.

H. The bidirectional valve of any one of embodiments A-G, further comprising a valve stem packing system comprising:
  a plurality of packing rings having an inner diameter dimensioned to be disposable around the valve stem, and an outer diameter dimensioned to be locatable within an inner diameter of the packing bore disposed radially around the valve stem in the valve body, wherein the packing system comprises:

a thermoplastic ring assembly sandwiched between, and in physical contact with a sealing ring assembly sandwiched between, and in physical contact with an anti-extrusion ring assembly and the valve body, wherein the thermoplastic ring assembly comprises at least one thermoplastic ring having an inner diameter dimensioned and arranged to sealingly engage the valve stem and an outer diameter dimensioned and arranged to sealingly engage the inner diameter of the packing bore, and opposing annular surfaces dimensioned and arranged to physically engage annular surfaces of the sealing ring assembly;

wherein the sealing ring assembly comprises an outer sealing ring having an inner annular surface in physical contact with an outer annular surface of the thermoplastic ring assembly, and an inner sealing ring having an outer annular surface in physical contact with an inner annular surface of the thermoplastic ring assembly, wherein each sealing ring has an inner diameter dimensioned and arranged to sealingly engage the valve stem and an outer diameter dimensioned and arranged to sealingly engage the inner diameter of the packing bore;

wherein the anti-extrusion ring assembly comprises at least one upper anti-extrusion ring having an inner annular surface in physical contact with an outer annular surface of the outer sealing ring;

wherein the sealing rings have a hardness which is greater than a hardness of the at least one thermoplastic ring, and wherein the anti-extrusion ring has a hardness which is greater than a hardness of the sealing rings.

I. The bidirectional valve of any one of embodiments A-H, wherein the anti-extrusion ring assembly further comprises an inner anti-extrusion ring having an outer annular surface in physical contact with an inner annular surface of the inner sealing ring and an outer annular surface in physical contact with the valve body.

J. The bidirectional valve of any one of embodiments A-I, wherein the inner annular surface of the outer anti-extrusion ring, the outer annular surface of the inner anti-extrusion ring, or both comprise a chamfer disposed along an outer radial edge of the anti-extrusion ring.

K. The bidirectional valve of any one of embodiments A-J, wherein the thermoplastic ring assembly comprises a plurality of individual thermoplastic rings sandwiched between the outer sealing ring and the inner sealing ring.

L. The bidirectional valve of any one of embodiments A-K, wherein the at least one thermoplastic ring and the sealing rings individually comprise an engineering thermoplastic selected from the group consisting of a polycarbonate resin, a polyamide resin, a polyester resin, a polyether ether ketone resin, a polyacrylate resin, a polybutylene naphthalate resin, a liquid crystal polyester, a polyoxalkylene diimide diacid/polybutyrate terephthalate copolymer, a nitrile resin, polyoxymethylene resin, a styrene-acrylonitrile copolymer, a methacrylonitrile-styrene copolymer, a methacrylonitrile-styrene-butadiene copolymer; an acrylate resin, a polyvinyl acetate, a polyvinyl alcohol, a chloride resin, a fluoride resin, a cellulose resin, a polyimide resin, a polysulfone resin, a polyacetal resin, a polylactone resin, a polyketones, a polyphenylene oxide resin, a polyphenylene oxide/polystyrene resin, a polyphenylene sulfide resin, a styrene resin, an acrylonitrile-butadiene-styrene resin, a polyolefin resin, and a combination thereof.

M. The bidirectional valve of any one of embodiments A-L, wherein the at least one thermoplastic ring comprises polyvinyl fluoride (PVF), polychlorofluoroethylene (PCFE), polytetrafluoroethylene (PTFE), or a combination thereof.

N. The bidirectional valve of any one of embodiments A-M, wherein the sealing rings individually comprise a polyamide resin, a polyphenylene oxide/polystyrene resin, a polyoxymethylene resin, a polyether ether ketone, or a combination thereof.

O. The bidirectional valve of any one of embodiments A-N, wherein the at least one thermoplastic ring has a Rockwell R hardness determined according to ASTM D785 or an equivalent thereof, of less than or equal to about 100R, and wherein the sealing ring has a Rockwell R hardness of greater than about 100R.

P. The bidirectional valve of any one of embodiments A-O, wherein a Rockwell R hardness of the sealing rings is greater than the Rockwell R hardness of the at least one thermoplastic ring by at least about 50R units, wherein the Rockwell R hardness is determined according to ASTM D785, or an equivalent thereof Q. The bidirectional valve of any one of embodiments A-P, wherein the at least one anti-extrusion ring comprises brass, steel, titanium, silicon carbide, an at least partially austenitic steel alloy, or a combination thereof.

R. The bidirectional valve of any one of embodiments A-Q, wherein the at least one anti-extrusion ring comprises an austenitic steel alloy comprising iron, chromium, nickel, manganese, silicone, and nitrogen.

S. The bidirectional valve of any one of embodiments A-R, wherein a fluid applied to the fluid flow bore is maintained by the valve in the closed position without leaking for at least one hour, wherein the applied fluid has a pressure of greater than 275.8 MPa (40,000 psi) and a temperature of greater than or equal to about 200° C.

T. A method comprising:

providing any one of the bidirectional valves of embodiments A-R, rotating the valve stem such that the control element is in the closed position prior to or after applying a pressurized fluid having a pressure of greater than 275.8 MPa (40,000 psi) and a temperature of greater than or equal to about 200° C. to the inlet end of the fluid flow bore or to the outlet end of the fluid flow bore and maintaining the pressure and temperature for at least 1 hour, wherein the fluid is maintained by the valve without leaking.

U. A method comprising:

providing a bidirectional valve comprising:
 a valve body comprising an axial fluid flow bore disposed therethrough having an inlet end located opposite an outlet end and a flow control assembly located within a portion of the fluid flow bore,
 the flow control assembly comprising a flow control element disposed between, and having an outer surface in sealing contact with an inner annular surface of an inlet valve seat and an inner annular surface of an outlet valve seat, wherein the flow control element is rotatable between an open and a closed position;
 a valve stem extending from an outer end through a packing bore disposed radially around the valve stem in the valve body to an inner end of the valve stem, wherein the inner end of the valve stem comprises a plurality of sides dimensioned and arranged to rotationally engage a corresponding recess having a corresponding number of sides disposed into the flow control element, wherein a distance between the sides of the recess are dimensioned relative to a distance between the plurality of sides of the first end of the valve stem to allow for an amount of lateral movement of the flow control element laterally between the fluid flow bore inlet end and the fluid flow bore outlet end such that a pressure applied to the inlet end of the fluid flow bore results in lateral movement of the flow control assembly towards the outlet end of the fluid flow bore in an amount sufficient to produce sealing contact between an outer annular surface of the outlet valve seat with a portion of the valve body, and such that a pressure applied to the outlet end of the fluid flow bore results in lateral movement of the flow control assembly towards the inlet end of the fluid flow bore in an amount sufficient to produce sealing contact between an outer annular surface of the inlet valve seat and a portion of the valve body, or a combination thereof, and rotating the valve stem such that the control element is in the closed position prior to or after applying a pressurized fluid having a pressure of greater than 275.8 MPa (40,000 psi) and a temperature of greater than or equal to about 200° C. to the inlet end of the fluid flow bore or to the outlet end of the fluid flow bore and maintaining the pressure and temperature for at least 1 hour, wherein the fluid is maintained by the valve without leaking.

V. The method of any one of embodiments T or U, wherein at least a portion of the inner annular surface of the inlet valve seat, the inner annular surface of the outlet valve seat, or a combination thereof, comprise a sealing face dimensioned and arranged to sealingly engage a portion of the outer surface of the fluid control element, and wherein at least a portion of the inner annular surface of the inlet valve seat, the inner annular surface of the outlet valve seat, or a combination thereof, comprise a plurality of support surfaces dimensioned and arranged in physical contact with the outer surface of the fluid control element adjacent the sealing face.

W. The method of any one of embodiments T-V, wherein the bidirectional valve further comprises a valve stem packing system comprising:

a plurality of packing rings having an inner diameter dimensioned to be disposable around the valve stem, and an outer diameter dimensioned to be locatable within an inner diameter of the packing bore disposed radially around the valve stem in the valve body, wherein the packing system comprises:

a thermoplastic ring assembly sandwiched between, and in physical contact with a sealing ring assembly sandwiched between, and in physical contact with an anti-extrusion ring assembly and the valve body, wherein the thermoplastic ring assembly comprises at least one thermoplastic ring having an inner diameter dimensioned and arranged to sealingly engage the valve stem and an outer diameter dimensioned and arranged to sealingly engage the inner diameter of the packing bore, and opposing annular surfaces dimensioned and arranged to physically engage annular surfaces of the sealing ring assembly;

wherein the sealing ring assembly comprises an outer sealing ring having an inner annular surface in physical contact with an outer annular surface of the thermoplastic ring assembly, and an inner sealing ring having an outer annular surface in physical contact with an inner annular surface of the thermoplastic ring assembly, wherein each sealing ring has an inner diameter dimensioned and arranged to sealingly engage the valve stem and an outer diameter dimensioned and arranged to sealingly engage the inner diameter of the packing bore;

wherein the anti-extrusion ring assembly comprises at least one upper anti-extrusion ring having an inner annular surface in physical contact with an outer annular surface of the outer sealing ring, wherein the sealing rings have a hardness which is greater than a hardness of the at least one thermoplastic ring, and wherein the anti-extrusion ring has a hardness which is greater than a hardness of the sealing rings.

1. A valve comprising:
a valve body comprising a fluid flow bore disposed therethrough having an inlet end, an outlet end and a flow control assembly located within a portion of the fluid flow bore;
the flow control assembly comprising a flow control element disposed between, and having an outer surface (with respect to the flow control element) for sealing contact with, an inner annular surface (with respect to the flow control element) of an inlet valve seat and an inner annular surface of an outlet valve seat, wherein the flow control element is rotatable between an open and a closed position;
a Belleville spring biasing the inlet valve seat against the flow control element;
a valve stem extending from an outer end (with respect to the flow control element) through a packing bore disposed radially around the valve stem in the valve body to an inner end (with respect to the flow control element) of the valve stem rotationally engaging a recess disposed in the flow control element; and
a compression spring member having inner and outer annular sealing surfaces on opposite sides thereof to form a first fluid seal between the inlet valve seat and the valve body when a first pressure is applied to the outlet end of the fluid flow bore to compress the spring member; and
an outer annular surface of the inlet valve seat adjacent to the annular sealing surfaces of the compression spring member, and opposing a surface of the valve body to form a second fluid seal between the inlet valve seat and the valve body when a second pressure that is higher than the first pressure is applied to the outlet end of the fluid flow bore.

2. The valve of embodiment 1, further comprising.
an inlet sealing face on a portion of the inner annular surface of the inlet valve seat dimensioned and arranged to physically contact and sealingly engage a portion of the outer surface of the fluid flow control element;
a first plurality of support surfaces adjacent the inlet sealing face dimensioned and arranged to physically contact the outer surface of the fluid flow control element; and
a first plurality of respective vent grooves disposed between adjacent ones of the first plurality of support surfaces, and between the first plurality of support surfaces and the inlet sealing face.

3. The valve of embodiment 1 or embodiment 2, wherein the spring member is compressed between the inner and outer annular sealing surfaces, as the applied pressure is increased up to the first pressure to form the first fluid seal, before the outer annular surface of the inlet valve seat and the opposing surface of the valve body form the second fluid seal at the second pressure.

4. The valve of any one of embodiments 1 to 3, wherein an inside diameter of the compression spring member is greater than an outside diameter of the outer annular surface of the inlet valve seat.

5. The valve of any one of embodiments 1 to 4, wherein an inside diameter of the compression spring member is greater than an outside diameter of the Bellville spring.

6. The valve of any one of embodiments 1 to 5, further comprising receiving the compression spring member in a recess formed at an outside radial edge of the outer end of the inlet valve seat.

7. The valve of any one of embodiments 1 to 6, wherein the compression spring member is toroidal and the torus has a generally C-shaped minor profile; wherein the minor profile comprises inner and outer legs extending away from a crown, wherein the inner and outer legs flare outwardly with respect to a plane bisecting the crown, as the legs extend away from an apex of the crown toward free ends, when the compression spring member is in a relaxed condition, and wherein the compression of the compression spring member reduces a distance between the free ends of the inner and outer legs.

8. The valve of any one of embodiments 1 to 7, wherein the crown has a diameter with respect to a major axis of the torus that is less than diameters at the free ends of the inner and outer legs.

9. The valve of any one of embodiments 1 to 8, further comprising an outer annular surface of the inlet valve seat adjacent to the annular sealing surfaces of the compression spring member, and opposing a surface of the valve body to form a second fluid seal between the inlet valve seat and the valve body when a second pressure that is higher than the first pressure is applied to the outlet end of the fluid flow bore.

10. The valve of any one of embodiments 1 to 9, wherein the spring member is compressed between the inner and outer annular sealing surfaces, as the applied pressure is increased up to the first pressure to form the first fluid seal, before the outer annular surface of the inlet valve seat and the opposing surface of the valve body form the second fluid seal at the second pressure.

11. The valve of any one of embodiments 1 to 10, wherein an inside diameter of the compression spring member is greater than an outside diameter of the outer annular surface of the inlet valve seat.

12. The valve of any one of embodiments 1 to 11, wherein an inside diameter of the outer annular surface of the inlet valve seat is greater than an outside diameter of the Bellville spring.

13. The valve of any one of embodiments 1 to 12, further comprising a recess formed at an outside radial edge of the outer end of the inlet valve seat to receive the compression spring member.

14. The valve of any one of embodiments 1 to 13, wherein the compression spring member is toroidal and the torus has a generally C-shaped minor profile.

15. The valve of any one of embodiments 1 to 14, wherein the minor profile comprises inner and outer legs extending away from a crown, wherein the inner and outer legs flare outwardly with respect to a plane bisecting the crown, as the legs extend away from an apex of the crown toward free ends, when the compression spring member is in a relaxed condition, and wherein the compression of the compression spring member reduces a distance between the free ends of the inner and outer legs.

16. The valve of any one of embodiments 1 to 15, wherein the crown has a diameter with respect to a major axis of the torus that is less than diameters at the free ends of the inner and outer legs.

The invention is described above in reference to specific examples and embodiments. The metes and bounds of the invention are not to be limited by the foregoing disclosure, which is illustrative only, but should be determined in accordance with the full scope and spirit of the appended claims. Various modifications will be apparent to those skilled in the art in view of the description and examples. It is intended that all such variations within the scope and spirit of the appended claims be embraced thereby.

What is claimed is:

1. A method comprising:
    locating a flow control assembly in a fluid flow bore disposed through a valve body, the fluid flow bore having an inlet end and an outlet end, the flow control assembly comprising a flow control element disposed between inlet and outlet valve seats and having an outer surface for sealing contact with an inner annular surface of the inlet and outlet valve seats;
    biasing the inlet valve seat against the flow control element with a Belleville spring;
    extending a valve stem from an outer end, with respect to the flow control element, through a packing bore disposed radially around the valve stem in the valve body to an inner end, with respect to the flow control element, of the valve stem to rotationally engage the inner end of the valve stem with a recess disposed in the flow control element;
    rotating the valve stem to rotate the flow control element between open and closed positions;
    applying a first pressurized fluid to the outlet end of the fluid flow bore to form a first fluid seal between a sealing face on a portion of the inner annular surface of the inlet valve seat in physical contact with the outer surface of the fluid flow control element;
    physically contacting the outer surface of the flow control element with a first plurality of support surfaces located on the inner annular surface adjacent the sealing face of the inlet valve seat;
    separating adjacent ones of the first plurality of support surfaces with a like plurality of vent grooves on the inner annular surface of the inlet valve seat between adjacent ones of the first plurality of support surfaces; and
    separating the first plurality of support surfaces from the sealing face of the inlet valve seat with an annular vent groove on the inner annular surface of the inlet valve seat between the respective sealing face and the support surfaces.

2. The method of claim 1, further comprising forming a second fluid seal between an outer annular surface of the inlet valve seat and an opposing surface of the valve body.

3. The method of claim 2, further comprising maintaining the first pressurized fluid applied to the outlet end of the fluid flow bore at a pressure of greater than 275.8 MPa (40,000 psi) and a temperature of greater than or equal to about 200° C. for at least 1 hour without leaking past the flow control element into the inlet end of the fluid flow bore.

4. The method of claim 2, further comprising:
applying a second pressurized fluid to the inlet end of the fluid flow bore to form a third fluid seal between a sealing face on a portion of the inner annular surface of the outlet valve seat in physical contact with the outer surface of the fluid flow control element;
physically contacting the outer surface of the flow control element with a second plurality of support surfaces located on the inner annular surface adjacent the sealing face of the outlet valve seat;
separating adjacent ones of the second plurality of support surfaces with a like plurality of vent grooves on the inner annular surface of the outlet valve seat between adjacent ones of the second plurality of support surfaces; and
separating the second plurality of support surfaces from the sealing face of the outlet valve seat with an annular vent groove on the inner annular surface of the outlet valve seat between the respective sealing face and the support surfaces.

5. The method of claim 4, further comprising forming a fourth fluid seal between an outer annular surface of the outlet valve seat and an opposing surface of the valve body.

6. The method of claim 5, further comprising maintaining the second pressurized fluid applied to the inlet end of the fluid flow bore at a pressure of greater than 275.8 MPa (40,000 psi) and a temperature of greater than or equal to about 200° C. for at least 1 hour without leaking past the flow control element into the outlet end of the fluid flow bore.

7. The method of claim 4, further comprising attaching the outlet valve seat to the valve body using a plurality of threaded members, radially spaced about an outer radial edge of the outlet valve seat, and engaged with the outlet valve seat and the valve body.

8. The method of claim 4, further comprising applying a spray and fuse coating on the inlet and outlet sealing faces and the first and second plurality of support surfaces, the spray and fuse coating comprising metals from Groups 6-12 of the periodic table of the elements alone, or in compounds comprising elements from Groups 13-16 of the periodic table of the elements.

9. The method of claim 1, further comprising:
providing the inner end of the valve stem with a plurality of sides;
providing the recess in the flow control element with a corresponding number of opposing sides;
providing distances between the sides of the inner end of the valve stem and the opposing sides of the recess;
allowing an amount of lateral movement of the flow control element between the fluid flow bore outlet end and the fluid flow bore inlet end such that the application of the first pressurized fluid to the outlet end of the fluid flow bore results in lateral movement of the flow control assembly towards the inlet end.

10. The method of claim 1, further comprising providing a shoulder on the valve stem with an enlarged outer diameter formed on the valve stem wherein an outside diameter of the shoulder is greater than an inside diameter of a portion of the valve body, a portion of a bracket attached to the valve body, a bushing attached to the valve body, or a combination thereof disposed around the valve stem between the outer end of the valve stem and the shoulder.

11. The method of claim 1, further comprising:
disposing a plurality of packing rings in the packing bore, the packing rings having an inner diameter disposed around the valve stem and an outer diameter disposed adjacent a cylindrical surface of the packing bore;
positioning an inner anti-extrusion ring in the packing bore between the packing rings and an inner end of the packing bore; and
positioning an outer anti-extrusion ring in the packing bore between the packing rings and a packing gland.

12. A valve comprising:
a valve body comprising a fluid flow bore disposed therethrough having an inlet end, an outlet end and a flow control assembly located within a portion of the fluid flow bore;
the flow control assembly comprising a flow control element disposed between, and having an outer surface, with respect to the flow control element, for sealing contact with, an inner annular surface, with respect to the flow control element of an inlet valve seat and an inner annular surface of an outlet valve seat, wherein the flow control element is rotatable between an open and a closed position;
a Belleville spring biasing the inlet valve seat against the flow control element;
a valve stem extending from an outer end, with respect to the flow control element, through a packing bore disposed radially around the valve stem in the valve body to an inner end, with respect to the flow control element of the valve stem rotationally engaging a recess disposed in the flow control element;
an inlet sealing face on a portion of the inner annular surface of the inlet valve seat dimensioned and arranged to physically contact and sealingly engage a portion of the outer surface of the fluid flow control element;
a first plurality of support surfaces adjacent the inlet sealing face dimensioned and arranged to physically contact the outer surface of the fluid flow control element; and
a first plurality of respective vent grooves disposed between adjacent ones of the first plurality of support surfaces, and between the first plurality of support surfaces and the inlet sealing face.

13. The valve of claim 12, further comprising:
an outlet sealing face on a portion of the inner annular surface of the outlet valve seat dimensioned and arranged to sealingly engage a portion of the outer surface of the fluid flow control element;
a second plurality of support surfaces adjacent the outlet sealing face dimensioned and arranged to physically contact the outer surface of the fluid flow control element; and
a second plurality of respective vent grooves disposed between adjacent ones of the second plurality of support surfaces, and between the second plurality of support surfaces and the outlet sealing face.

14. The valve of claim 13, further comprising a spray and fuse coating on the inlet and outlet sealing faces and the first and second plurality of support surfaces, the spray and fuse coating comprising metals from Groups 6-12 of the periodic table of the elements alone, or in compounds comprising elements from Groups 13-16 of the periodic table of the elements.

15. The valve of claim 13, wherein the outlet valve seat is attached to the valve body using a plurality of threaded members, radially spaced about an outer radial edge of the outlet valve seat, and engaged with the outlet valve seat and the valve body.

16. The valve of claim 12, wherein the inner end of the valve stem comprises a plurality of sides, the recess in the flow control element has a corresponding number of opposing sides, and distances between the sides of the inner end of the valve stem and the opposing sides of the recess are dimensioned to allow for an amount of lateral movement of the flow control element between the fluid flow bore outlet end and the fluid flow bore inlet end such that a pressure applied to the outlet end of the fluid flow bore results in lateral movement of the flow control assembly towards the inlet end.

17. The valve of claim 16, wherein the lateral movement of the fluid flow bore allows sealing contact between an outer annular surface of the inlet valve seat and the valve body when pressure is applied to the outlet end of the fluid flow bore, and sealing contact between an outer annular surface of the outlet valve seat and the valve body when pressure is applied to the inlet end of the fluid flow bore.

18. The valve of claim 12, further comprising a spray and fuse coating on the inlet sealing face and the first plurality of support surfaces, the spray and fuse coating comprising metals from Groups 6-12 of the periodic table of the elements alone, or in compounds comprising elements from Groups 13-16 of the periodic table of the elements.

19. The valve of claim 12, further comprising a shoulder on the valve stem with an enlarged outer diameter formed on the valve stem wherein the outside diameter of the shoulder is greater than an inside diameter of a portion of the valve body, a portion of a bracket attached to the valve body, a bushing attached to the valve body, or a combination thereof disposed around the valve stem between the outer end of the valve stem and the shoulder.

20. The valve of claim 12, further comprising a valve stem packing system comprising:
  a plurality of packing rings disposed in the packing bore, the packing rings having an inner diameter disposed around the valve stem and an outer diameter disposed adjacent a cylindrical surface of the packing bore;
  an inner anti-extrusion ring in the packing bore between the packing rings and an inner end of the packing bore; and
  an outer anti-extrusion ring in the packing bore between the packing rings and a packing gland.

* * * * *